United States Patent
Mueller et al.

(10) Patent No.: US 8,473,453 B2
(45) Date of Patent: *Jun. 25, 2013

(54) CAPTURING DATA FROM USER SELECTED PORTIONS OF A BUSINESS PROCESS AND TRANSFERRING CAPTURED DATA TO USER IDENTIFIED DESTINATIONS

(75) Inventors: Ralf Mueller, Waghaeusel-Wiesental (DE); Kireet M. Reddy, San Mateo, CA (US); Bhagat V. Nainani, Fremont, CA (US); William Eidson, Palo Alto, CA (US); Edwin Khodabakchian, Atherton, CA (US); Weigun Mi, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 12/395,596

(22) Filed: Feb. 27, 2009

(65) Prior Publication Data

US 2009/0177985 A1 Jul. 9, 2009

Related U.S. Application Data

(63) Continuation of application No. 11/282,977, filed on Nov. 18, 2005, now Pat. No. 7,499,951.

(51) Int. Cl.
*G06F 17/30* (2006.01)
(52) U.S. Cl.
USPC .......................................................... 707/608
(58) Field of Classification Search
USPC .................. 707/805, 608; 705/7–10, 301
See application file for complete search history.

(56) References Cited

U.S. PATENT DOCUMENTS

| | | | |
|---|---|---|---|
| 6,016,501 A | 1/2000 | Martin et al. | |
| 6,757,689 B2 | 6/2004 | Battas et al. | |
| 6,850,643 B1 * | 2/2005 | Smith et al. | 382/173 |
| 7,499,951 B2 * | 3/2009 | Mueller et al. | 1/1 |
| 7,610,575 B2 * | 10/2009 | Sproule | 717/103 |
| 2002/0038228 A1 | 3/2002 | Waldorf et al. | |
| 2003/0093402 A1 * | 5/2003 | Upton | 707/1 |
| 2003/0115334 A1 | 6/2003 | Bhat et al. | |
| 2003/0225769 A1 * | 12/2003 | Chkodrov et al. | 707/100 |

(Continued)

OTHER PUBLICATIONS

Lamonica, M. "Oracle releases data-gathering tool", May 17, 2004, CNET News.com, 2 pgs.

(Continued)

*Primary Examiner* — Etienne Leroux
(74) *Attorney, Agent, or Firm* — Silicon Valley Patent Group LLP; Omkar Suryadevara

(57) ABSTRACT

A graphical user interface (GUI) displays a flow of activities of a business process, including any portion thereof from which capture of data is permitted. The GUI receives, in an operation, at least an indication of a business process portion from which data is to be captured ("sensor"), an identification of an endpoint to which captured data is to be transferred, and a type of the endpoint which identifies (through a mapping) a predetermined software. A sensor may be added any number of times (through a single GUI or though multiple GUIs) by repeatedly performing the operation. Also, a given sensor may be associated with multiple endpoints. Computer(s) executing the business process check whether or not a sensor is present, on execution of the business process portion, and if present, then execute the corresponding predetermined software(s) to transfer data from the sensor directly to the respective endpoint(s).

24 Claims, 28 Drawing Sheets

U.S. PATENT DOCUMENTS

| | | | |
|---|---|---|---|
| 2003/0225820 | A1 | 12/2003 | Chkodrov et al. |
| 2004/0176968 | A1 | 9/2004 | Syed et al. |
| 2005/0049924 | A1 | 3/2005 | DeBettencourt et al. |
| 2005/0071243 | A1* | 3/2005 | Somasekaran et al. .......... 705/26 |
| 2005/0203957 | A1* | 9/2005 | Wang et al. ................. 707/104.1 |
| 2006/0101368 | A1* | 5/2006 | Kesarwani et al. ............. 716/11 |

OTHER PUBLICATIONS

Klinger, D. et al., "Building administrative applications in Eclipse", Nov. 12, 2004, 9 pgs.

Lublinsky, B. "An Introduction to Business Process Execution Language (BPEL): Part I", Business Integration Journal, Oct. 2004, pp. 58-60.

Eisenberg, R. "Business Process Management: The Next Generation of Software", EAI Journal, Jun. 2003, pp. 28-35.

Peltz, C. "Web Services Orchestration", 2002-2003 Hewlett-Packard Company, Jan. 2003, pp. 1-20.

Shaffer, D. et al., "Orchestrating Web Services: The Case for a BPEL Server", An Oracle White Paper, Jun. 2004, pp. 1-14.

"BPEL Moves to the BPI Forefront", InfoWorld, Aug. 30, 2004, Issue 35, InfoWorld Media Group, Inc., 4 pgs.

Office Action dated Oct. 31, 2007 in U.S. Appl. No. 11/282,977, pp. 18.

Amendment dated Jan. 31, 2008 in U.S. Appl. No. 11/282,977, pp. 22.

Final Office Action dated May 13, 2008 in U.S. Appl. No. 11/282,977, pp. 23.

Amendment after Final dated Aug. 18, 2008 in U.S. Appl. No. 11/282,977, pp. 10.

Examiner's Interview Summary dated Aug. 22, 2008 in U.S. Appl. No. 11/282,977, pp. 2.

Advisory Action dated Sep. 9, 2008 in U.S. Appl. No. 11/282,977, pp. 4.

Notice of Allowance and Examiner's Interview Summary dated Oct. 22, 2008 in U.S. Appl. No. 11/282,977, pp. 13.

* cited by examiner

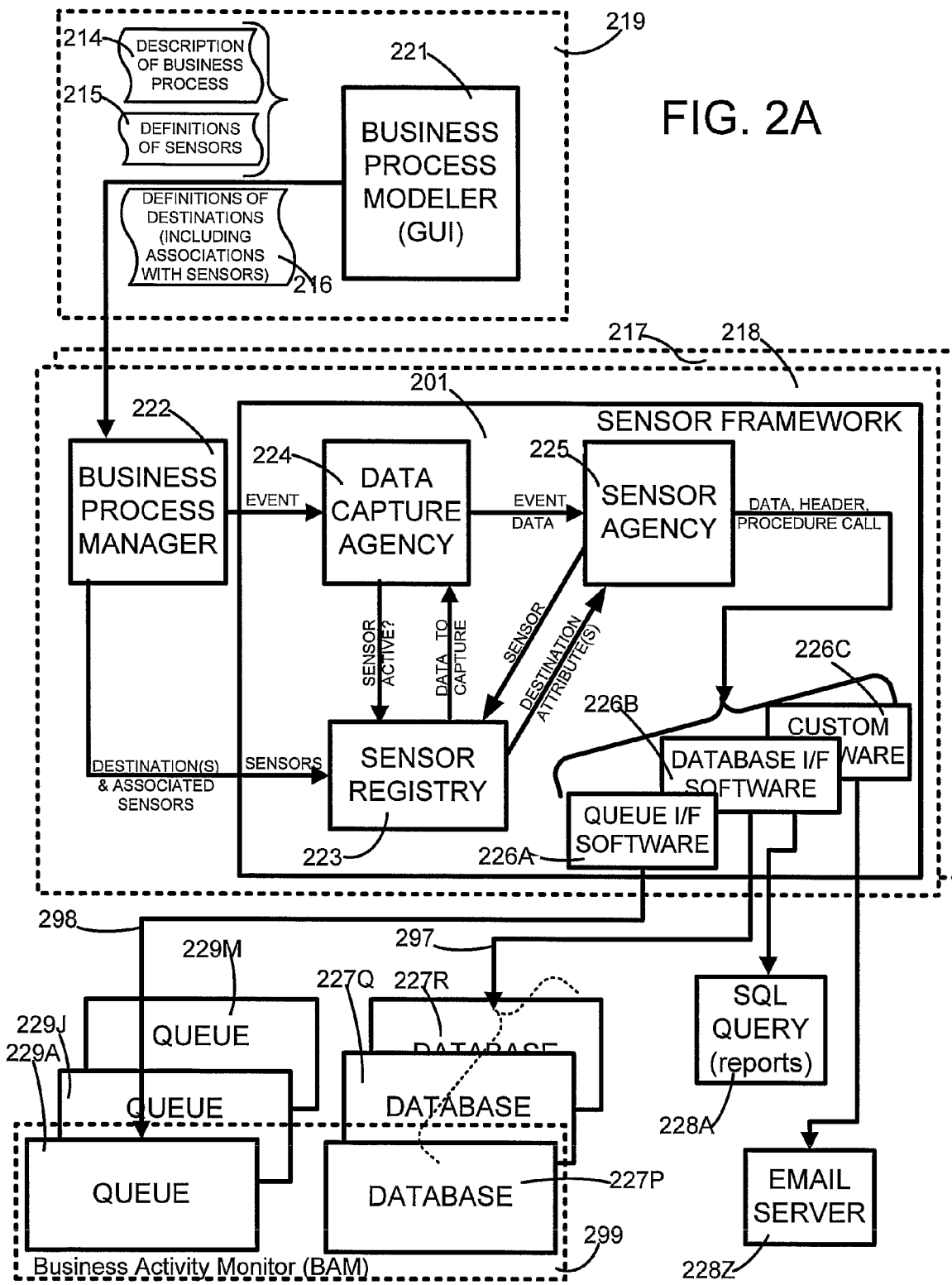

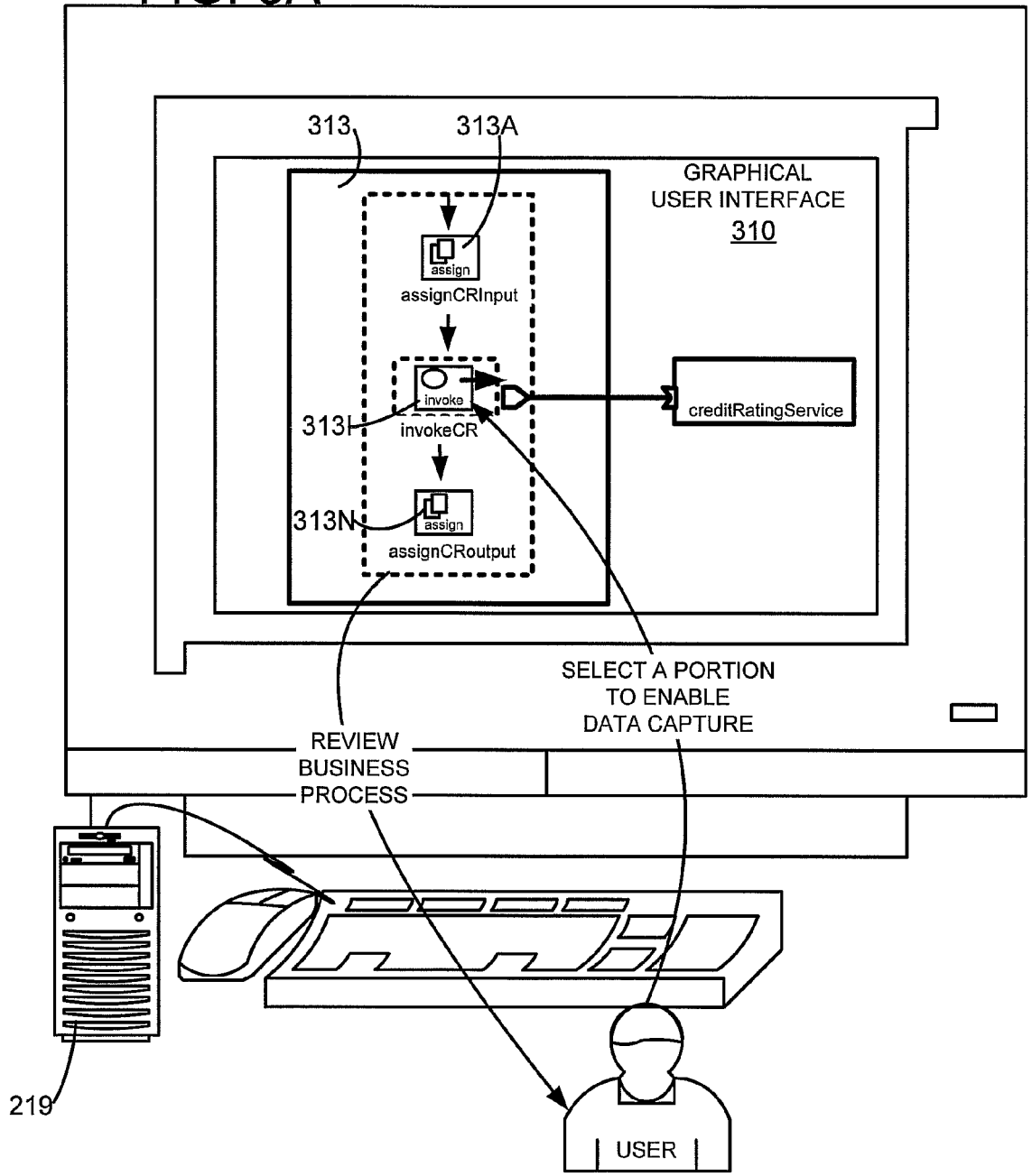

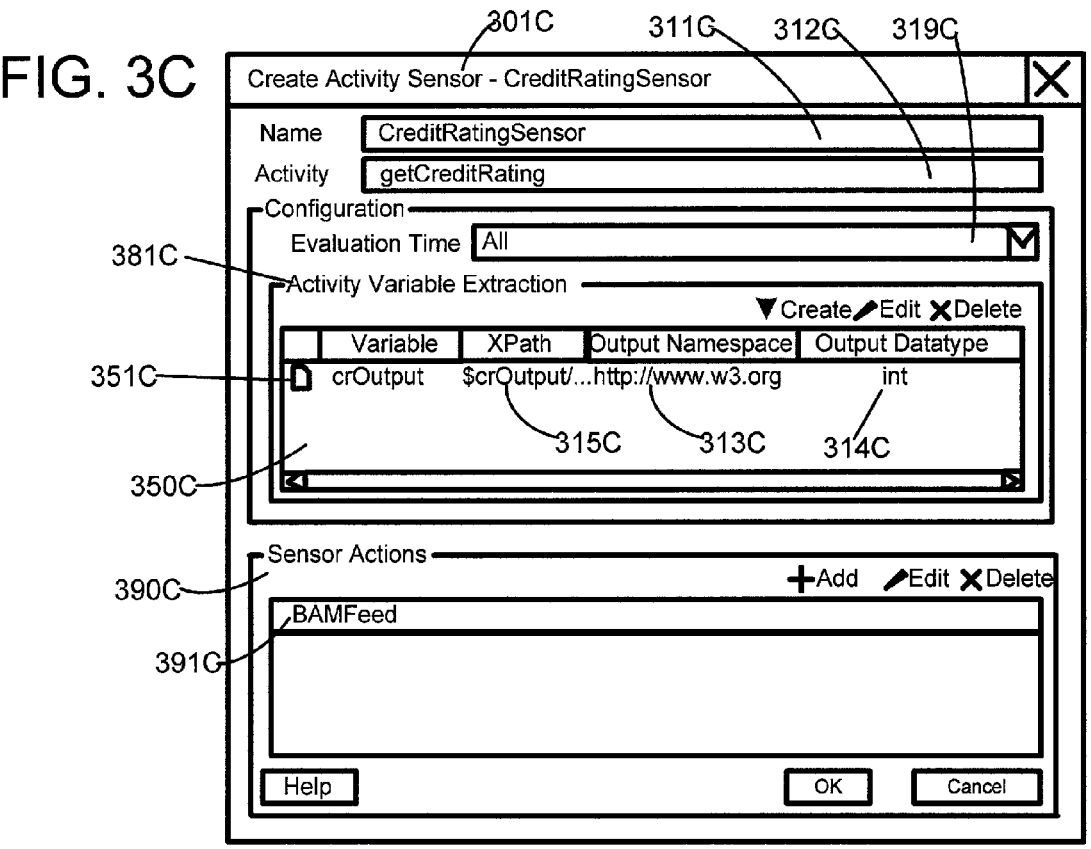

```
<sensor sensorName="CreditRatingSensor"
classname="oracle.tip.pc.services.reports.dca.agents.BpelActivitySen
sorAgent"
kind="activity"
target="getCreditRating">
<activityConfig evalTime="all">
<variable outputNamespace="http://www.w3.org/2001/XMLSchema"
outputDataType="int"
target="$crOutput/payload//services:rating/text()"/>
</activityConfig>
</sensor>
```

FIG. 3E1

```xml
<?xml version="1.0" encoding="utf-8"?>
<!--
 This schema contains the sensor definition. Sensors monitor data
 and execute callbacks appropriately.
-->
<xsd:schema blockDefault="#all" elementFormDefault="qualified"
        targetNamespace="http://xmlns.oracle.com/bpel/sensor"
        xmlns:xsd="http://www.w3.org/2001/XMLSchema"
        xmlns:tns="http://xmlns.oracle.com/bpel/sensor">

<xsd:include schemaLocation="SensorAction.xsd"/>

<xsd:simpleType name="tSensorKind">
    <xsd:restriction base="xsd:string">
      <xsd:enumeration value="fault"/>
      <xsd:enumeration value="variable"/>
      <xsd:enumeration value="activity"/>
    </xsd:restriction>
  </xsd:simpleType>

<xsd:complexType name="tActivityConfig">
    <xsd:annotation>
      <xsd:documentation>
        The configuration part of an activity sensor comprises of a mandatory 'evalTime' attribute
        and an optional list of variable configurations
      </xsd:documentation>
    </xsd:annotation>
    <xsd:complexContent>
      <xsd:extension base="tns:tSensorConfig">
        <xsd:sequence>
          <xsd:element name="variable" type="tns:tActivityVariableConfig" maxOccurs="unbounded" minOccurs="0"/>
        </xsd:sequence>
        <xsd:attribute name="evalTime" type="xsd:string" use="required"/>
      </xsd:extension>
    </xsd:complexContent>
  </xsd:complexType>

<xsd:complexType name="tAdapterConfig">
    <xsd:annotation>
      <xsd:documentation>
        The configuration part of a adapter activity extends the activty configuration with
        additional attributes for adapters
      </xsd:documentation>
    </xsd:annotation>
    <xsd:complexContent>
      <xsd:extension base="tns:tActivityConfig">
        <xsd:attribute name="headerVariable" use="required" type="xsd:string"/>
        <xsd:attribute name="partnerLink" use="required" type="xsd:string"/>
        <xsd:attribute name="portType" use="required" type="xsd:string"/>
        <xsd:attribute name="operation" use="required" type="xsd:string"/>
      </xsd:extension>
    </xsd:complexContent>
  </xsd:complexType>

<xsd:complexType name="tVariableConfig">
    <xsd:complexContent>
      <xsd:extension base="tns:tSensorConfig">
        <xsd:attribute name="outputDataType" use="required" type="xsd:string"/>
        <xsd:attribute name="outputNamespace" use="required" type="xsd:string"/>
        <xsd:attribute name="queryName" use="required" type="xsd:string"/>
      </xsd:extension>
    </xsd:complexContent>
  </xsd:complexType>
```

FIG. 3E

| FIG. 3E1 |
|----------|
| FIG. 3E2 |

FIG. 3E2

```
<xsd:complexType name="tActivityVariableConfig">
  <xsd:complexContent>
    <xsd:extension base="tns:tVariableConfig">
      <xsd:attribute name="target" type="xsd:string" use="required"/>
    </xsd:extension>
  </xsd:complexContent>
</xsd:complexType>

<xsd:complexType name="tFaultConfig">
  <xsd:complexContent>
    <xsd:extension base="tns:tSensorConfig"/>
  </xsd:complexContent>
</xsd:complexType>

<xsd:complexType name="tNotificationSvcConfig">
  <xsd:complexContent>
    <xsd:extension base="tns:tActivityConfig">
      <xsd:attribute name="inputVariable" use="required" type="xsd:string"/>
      <xsd:attribute name="outputVariable" use="required" type="xsd:string"/>
      <xsd:attribute name="operation" use="required" type="xsd:string"/>
    </xsd:extension>
  </xsd:complexContent>
</xsd:complexType>

<xsd:complexType name="tSensorConfig">
  <xsd:sequence>
    <xsd:element name="action" type="tns:tInlineSensorAction" minOccurs="0" maxOccurs="unbounded"/>
  </xsd:sequence>
</xsd:complexType>

<xsd:complexType name="tInlineSensorAction">
  <xsd:complexContent>
    <xsd:restriction base="tns:tSensorAction"/>
  </xsd:complexContent>
</xsd:complexType>

<xsd:complexType name="tSensor">
  <xsd:sequence>
    <xsd:element name="activityConfig" type="tns:tActivityConfig" minOccurs="0"/>
    <xsd:element name="adapterConfig" type="tns:tAdapterConfig" minOccurs="0"/>
    <xsd:element name="faultConfig" type="tns:tFaultConfig" minOccurs="0"/>
    <xsd:element name="notificationConfig" type="tns:tNotificationSvcConfig" minOccurs="0"/>
    <xsd:element name="variableConfig" type="tns:tVariableConfig" minOccurs="0"/>
  </xsd:sequence>
  <xsd:attribute name="sensorName" use="required" type="xsd:QName"/>
  <xsd:attribute name="kind" use="required" type="tns:tSensorKind"/>
  <xsd:attribute name="classname" use="required" type="xsd:string"/>
  <xsd:attribute name="target" use="required" type="xsd:string"/>
</xsd:complexType>

<xsd:complexType name="tSensorList">
  <xsd:sequence>
    <xsd:element name="sensor" type="tns:tSensor" minOccurs="0" maxOccurs="unbounded"/>
  </xsd:sequence>
</xsd:complexType>

<xsd:element name="sensors" type="tns:tSensorList"/>
<xsd:element name="sensor" type="tns:tSensor"/>
</xsd:schema>
```

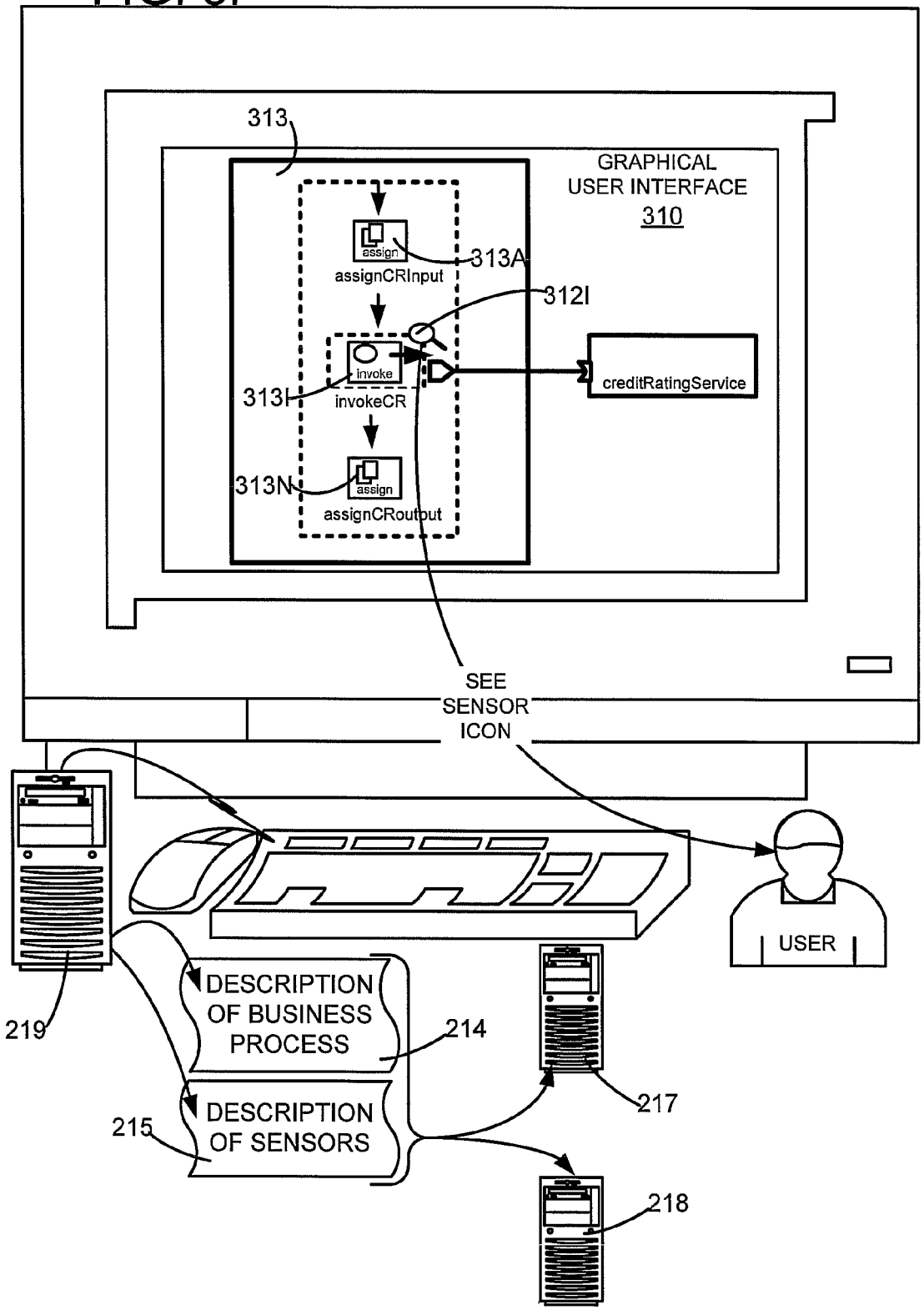

```
<sensor sensorName="IdentityServiceFault"
classname="oracle.tip.pc.services.reports.dca.agents.BpelFaultS
ensorAgent"
kind="fault"
target="{is:}identityServiceFault">
<faultConfig/>
</sensor>
```

343H

```
<sensor sensorName="LoanApplicationSensor"
classname="oracle.tip.pc.services.reports.dca.agents.BpelVariab
leSensorAgent"
kind="variable"
target="$input/payload">
<variableConfig outputNamespace=
"http://www.autoloan.com/ns/autoloan"
outputDataType="loanApplication"/>
</sensor>
```

FIG. 4A
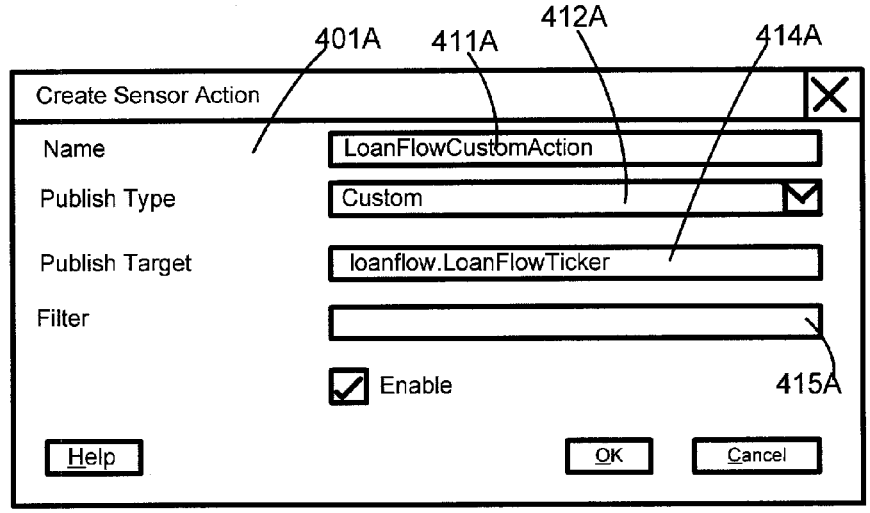
FIG. 4B
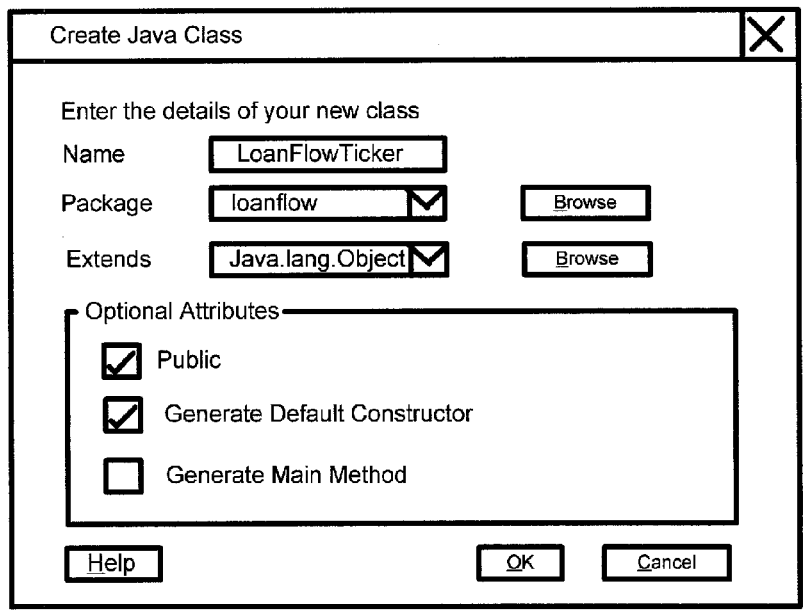
FIG. 4C
```
<action name="LoanFlowCustomAction"
      enabled='true'
      publishType="Custom"
      publishTarget="LoanFlowTicker">
  <sensorName>SelectedLoanProviderSensor</sensorName>
  <sensorName>SelectedLoanAPRSensor</sensorName>
</action>
```

FIG. 4D1

```xml
<?xml version="1.0" encoding="utf-8"?>
<!--
  $Header: $

A sensor action is used to define actions to be taken when its associated
  sensors (Sensor.xsd) notices interesting data. A sensor action can persist
  data to ProcessConnect Tables, send data to other applications via JMS,
  or call a custom software, "data publisher". Sensor action is also called
  "tuple"
-->
<xsd:schema blockDefault="#all"
            targetNamespace="http://xmlns.oracle.com/pcbpel/reports"
            xmlns:xsd="http://www.w3.org/2001/XMLSchema"
            xmlns:tns="http://xmlns.oracle.com/pcbpel/reports"
            elementFormDefault="qualified"
            attributeFormDefault="qualified">

<xsd:simpleType name="tSensorActionPublishType">
    <xsd:annotation>
      <xsd:documentation>
        This enumeration lists the possibe publishing types for probes.
      </xsd:documentation>
    </xsd:annotation>
    <xsd:restriction base="xsd:string">                          420
      <xsd:enumeration value="PCReportsSchema"/>
      <xsd:enumeration value="JMSQueue"/>
      <xsd:enumeration value="JMSTopic"/>
      <xsd:enumeration value="Custom"/>
    </xsd:restriction>
  </xsd:simpleType>
  <xsd:complexType name="tSensorActionProperty">
    <xsd:simpleContent>
      <xsd:extension base="xsd:string">
        <xsd:attribute name="name" use="required" type="xsd:string"/>
      </xsd:extension>
    </xsd:simpleContent>
  </xsd:complexType>

<!--
    Attributes of a sensor action
  -->
  <xsd:attributeGroup name="tSensorActionAttributes">
    <xsd:attribute name="name" type="xsd:string" use="optional"/>
    <xsd:attribute name="enabled" type="xsd:boolean" use="optional"
default="true"/>                       421
    <xsd:attribute name="filter" type="xsd:string"/>
    <xsd:attribute name="publishName" type="xsd:string" use="required"/>
    <xsd:attribute name="publishType" type="tns:tSensorActionPublishType"
use="required"/>
    <!--
      the name of the JMS Queue/Topic or custom java API, ignored for other
      publishTypes
    -->
    <xsd:attribute name="publishTarget" type="xsd:string" use="optional"/>
  </xsd:attributeGroup>
```

FIG. 4D2

```
<!--
    The sensor action type. A sensor action consists:
    + unique name
    + filter (to potentially suppress data publishing even if a sensor marks
             it as interesting). - Optional. If not defined, no filter is
             used.
    + publishName A name of a publisher
    + publishType What to do with the sensor data?
    + publishTarget Name of a JMS Queue/Topic or custom publisher.
    + potentially many sensors.
-->
<xsd:complexType name="tSensorAction">
    <xsd:sequence>
      <xsd:element name="sensorName" type="xsd:string" minOccurs="1"
maxOccurs="unbounded"/>
      <xsd:element name="property" minOccurs="0" maxOccurs="unbounded"
type="tns:tSensorActionProperty"/>             418
    </xsd:sequence>
    <xsd:attributeGroup ref="tns:tSensorActionAttributes"/>
</xsd:complexType>

<!--
    define a listing of sensor actions in a single document. It might be a
good idea  to
    have one sensor action list per business process.
-->
<xsd:complexType name="tSensorActionList">
    <xsd:sequence>
      <xsd:element name="action" type="tns:tSensorAction" minOccurs="0"
maxOccurs="unbounded"/>
    </xsd:sequence>
</xsd:complexType>

<xsd:element name="actions" type="tns:tSensorActionList"/>
</xsd:schema>
```

FIG. 4D

| FIG. 4D1 |
|----------|
| FIG. 4D2 |

FIG. 4E

```xml
<actionData xmlns="http://xmlns.oracle.com/pcbpel/reports"
            xmlns:pc="http://xmlns.oracle.com/pcbpel/reports"
            xmlns:data="http://samples.otn.com">
<header>
  <sensor sensorName="LoanRequestSensor"
classname="oracle.tip.pc.services.reports.dca.agents.BpelVariableSensorAgent"
          kind="variable"
          target="$input/payload">
    <configuration xmlns="http://xmlns.oracle.com/pcbpel/sensor">
      <pc:variableConfig xmlns:pc="http://xmlns.oracle.com/pcbpel/reports"
        outputNamespace="http://www.autoloan.com/ns/autoloan"
        outputDataType="LoanApplicationType"/>
    </configuration>
  </sensor>
  <instanceId>3101</instanceId>
  <midTierInstance>nessie:9700</midTierInstance>
  <processName>LoanFlow</processName>
  <processRevision>1.0</processRevision>
  <domain>default</domain>
</header>
<payload>
  <variableData>
    <dataType>12</dataType>
    <data>
        <loanApplication>
          <SSN>1234</SSN>
          <email>Scott.Tiger@oracle.com</email>
          <customerName>Scotty</customerName>
          <loanAmount>100000.50</loanAmount>
          <carModel>BMW Z8</carModel>
          <carYear>2004</carYear>
          <creditRating>0</creditRating>
        </loanApplication>
    </data>
    <target>$input/payload</target>
    <updaterName>receiveInput</updaterName>
    <updaterType>receive</updaterType>
  </variableData>
</payload>
</actionData>
```

```xml
<?xml version="1.0" encoding="utf-8"?>
<!-- This file defines the xml document presented to data publishers by sensor actions (SensorAction.xsd).
-->
<xsd:schema blockDefault="#all" elementFormDefault="qualified"
        targetNamespace="http://xmlns.oracle.com/bpel/sensor"
        xmlns:xsd="http://www.w3.org/2001/XMLSchema"
        xmlns:tns="http://xmlns.oracle.com/bpel/sensor">

<xsd:include schemaLocation="Sensor.xsd"/>

<xsd:complexType name="tRouterData">
        <xsd:sequence>
            <xsd:element name="header" type="tns:tHeaderInfo"/>
            <xsd:element name="payload" type="tns:tSensorData"/>
        </xsd:sequence>
    </xsd:complexType>

<xsd:complexType name="tHeaderInfo">
        <xsd:sequence>
            <xsd:element name="processName" type="xsd:string"/>
            <xsd:element name="processRevision" type="xsd:string"/>
            <xsd:element name="domain" type="xsd:string"/>
            <xsd:element name="instanceId" type="xsd:integer"/>
            <xsd:element name="midTierInstance" type="xsd:string"/>
            <xsd:element name="timestamp" type="xsd:dateTime"/>
            <xsd:element name="sensor" type="tns:tSensor"/>
        </xsd:sequence>
    </xsd:complexType>

<xsd:complexType name="tSensorData">
        <xsd:sequence>
            <xsd:element name="activityData" type="tns:tActivityData" minOccurs="0"/>
            <xsd:element name="faultData" type="tns:tFaultData" minOccurs="0"/>
            <xsd:element name="adapterData" minOccurs="0" type="tns:tAdapterData"/>
            <xsd:element name="variableData" type="tns:tVariableData" minOccurs="0" maxOccurs="unbounded"/>
            <xsd:element name="notificationData" type="tns:tNotificationData" minOccurs="0"/>
        </xsd:sequence>
    </xsd:complexType>

<xsd:complexType name="tFaultData">
        <xsd:sequence>
            <xsd:element name="activityName" type="xsd:string"/>
            <xsd:element name="activityType" type="xsd:string"/>
            <xsd:element name="data" type="xsd:anyType" minOccurs="0"/>
        </xsd:sequence>
    </xsd:complexType>

<xsd:complexType name="tActivityData">
        <xsd:sequence>
            <xsd:element name="activityType" type="xsd:string"/>
            <xsd:element name="evalPoint" type="xsd:string"/>
            <xsd:element name="errorMessage" nillable="true" minOccurs="0" type="xsd:string"/>
        </xsd:sequence>
    </xsd:complexType>

<!--
    xml type that will be provided to sensors for variable Datas. Note the
        any element represents variable data.
    -->
    <xsd:complexType name="tVariableData">
        <xsd:sequence>
            <xsd:element name="target" type="xsd:string"/>
            <xsd:element name="queryName" type="xsd:string"/>
            <xsd:element name="updaterName" type="xsd:string" minOccurs="1"/>
            <xsd:element name="updaterType" type="xsd:string" minOccurs="1"/>
            <xsd:element name="data" type="xsd:anyType"/>
            <xsd:element name="dataType" type="xsd:integer"/>
        </xsd:sequence>
    </xsd:complexType>
```

```xml
<xsd:complexType name="tNotificationData">
  <xsd:complexContent>
    <xsd:extension base="tns:tActivityData">
      <xsd:sequence>
        <xsd:element name="messageID" type="xsd:string" minOccurs="0" maxOccurs="unbounded"/>
        <xsd:element name="fromAddress" type="xsd:string" minOccurs="0"/>
        <xsd:element name="toAddress" type="xsd:string" minOccurs="0"/>
        <xsd:element name="deliveryChannel" type="xsd:string" minOccurs="0"/>
      </xsd:sequence>
    </xsd:extension>
  </xsd:complexContent>

</xsd:complexType>
<xsd:complexType name="tAdapterData">
  <xsd:complexContent>
    <xsd:extension base="tns:tActivityData">
      <xsd:sequence>
        <xsd:element name="endpoint" type="xsd:string"/>
        <xsd:element name="direction" type="xsd:string"/>
        <xsd:element name="adapterType" type="xsd:string"/>
        <xsd:element name="priority" type="xsd:string" minOccurs="0"/>
        <xsd:element name="messageSize" type="xsd:string" minOccurs="0"/>
      </xsd:sequence>
    </xsd:extension>
  </xsd:complexContent>
</xsd:complexType>

<!--
<xsd:simpleType name="tActivityEvalPoint">
  <xsd:restriction>
    <xsd:enumeration value="start"/>
    <xsd:enumeration value="complete"/>
    <xsd:enumeration value="fault"/>
    <xsd:enumeration value="compensate"/>
    <xsd:enumeration value="retry"/>
  </xsd:restriction>
</xsd:simpleType>

<xsd:simpleType name="tNotificationAction">
  <xsd:restriction>
    <xsd:enumeration value="creation"/>
    <xsd:enumeration value="statusUpdate"/>
  </xsd:restriction>
</xsd:simpleType>
-->
```

FIG. 4F3

```xml
<!--
  The header of the document contains some metadata.
-->
<xsd:complexType name="tSensorActionHeader">
  <xsd:sequence>
    <xsd:element name="processName" type="xsd:string"/>
    <xsd:element name="processVersion" type="xsd:string"/>
    <xsd:element name="processID" type="xsd:long"/>
    <xsd:element name="midTierInstance" type="xsd:string"/>
  </xsd:sequence>
  <xsd:attribute name="actionName" use="required" type="xsd:string"/>
</xsd:complexType>

<!--
  The sensor action data element.
-->
<xsd:element name="actionData" type="tns:tSensorActionData"/>

<!--
  Sensor Action data is presented in the form of a header and potentially many data
  elements depending on how many sensors associated to the sensor action marked the
  data as interesting.
-->
<xsd:complexType name="tSensorActionData">
  <xsd:sequence>
    <xsd:element name="header" type="tns:tHeaderInfo"/>
    <xsd:element name="payload" type="tns:tSensorData" minOccurs="1"
        maxOccurs="1"/>
  </xsd:sequence>
</xsd:complexType>
</xsd:schema>
```

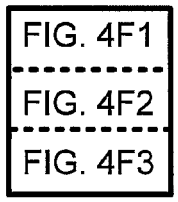

FIG. 4F

| FIG. 4F1 |
| FIG. 4F2 |
| FIG. 4F3 |

```
<action name="BAMFeed"
enabled="true"
publishType="JMSQueue"
publishTarget="jms/bamTopic">
<sensorName>LoanApplicationSensor</sensorName>
<property name="JMSConnectionFactory">
jms/QueueConnectionFactory
</property>
</action>
```
413H

FIG. 4I

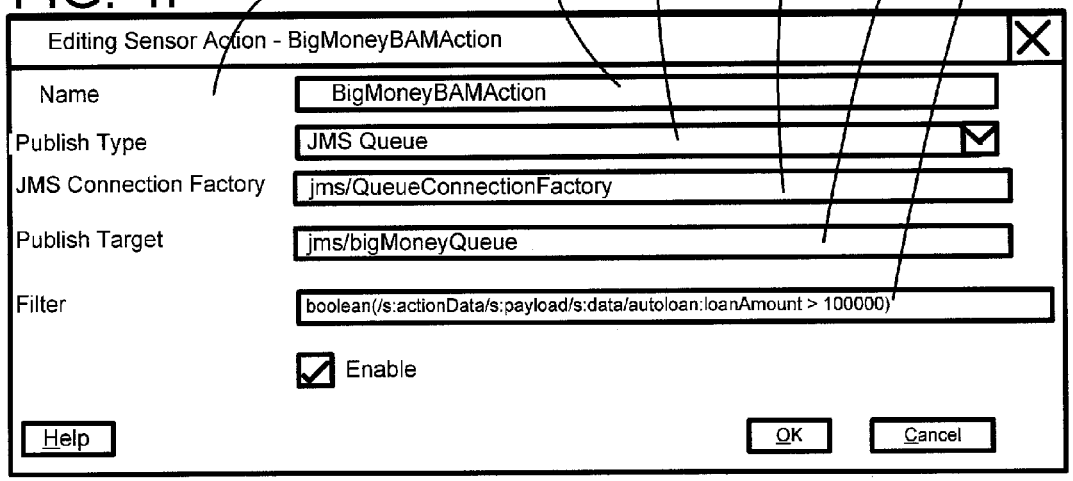

FIG. 4J

```
<action name="BigMoneyBAMAction"
enabled='true'
filter="boolean(/s:actionData/s:payload/s:variableData/s:data/autoloan:loanAmount >
100000)"
publishType="JMSQueue"
publishTarget="jms/bigMoneyQueue">
<sensorName>LoanApplicationSensor</sensorName>
<property name="JMSConnectionFactory">
jms/QueueConnectionFactory
</property>
</action>
```

```
<action name="PersistingAction"
enabled="true"
publishType="BPELReportsSchema">
<sensorName>LoanApplicationSensor</sensorName>
<sensorName>CreditRatingSensor</sensorName>
</action>
```

FIG. 4M

```java
import java.io.FileWriter;
import java.util.*;
import oracle.tip.pc.services.reports.sa.DataPublisher;
import oracle.tip.pc.services.reports.common.config.*;
import oracle.tip.pc.services.reports.common.data.*;
import orabpel.dom4j.dom.DOMElement;
public class LoanFlowTicker implements DataPublisher
{
  private static int VARIABLE_SWITCHER = 0;
  private boolean m_is_active = false;
  private FileWriter m_writer;
  public LoanFlowTicker()
  {
  }
  public void activate() throws Exception
  {
    m_writer = new FileWriter("D:\\tmp\\ticker.log", true);
    m_is_active = true;
  }
  public void passivate() throws Exception
  {
    m_is_active = false;
  }
  public boolean isActive()
  {
    return m_is_active;
  }
  public boolean sharesContainerManagedTransaction()
  {
    return false;
  }
  public void publish(ITSensorAction action, ITSensorActionData data)
throws Exception
  {
    ITSensorData payload = data.getPayload();
    ITVariableData varData;
    List varDataList = payload.getVariableData();
    DOMElement xmlData;
    if (varDataList != null)
    {
      varData = (ITVariableData) varDataList.get(0);
      xmlData = (DOMElement)varData.getData();
      if ((VARIABLE_SWITCHER % 2 ) == 0)
      {
        // First notification is the selected loan
            provider name
        m_writer.write("******* NEW LOAN OFFERED         *****\n");
        m_writer.write("Selected Loan: " + xmlData.getText());
      }
      else
      {
        // Second notification is the loan provider
            APR value
        m_writer.write(", APR: " + xmlData.getText());
        m_writer.write("\n");
        m_writer.write("******* END OF DATA *****\n");
        m_writer.write("\n");
      }
      VARIABLE_SWITCHER++;
    }
    else
    {
      m_writer.write("******* NO LOAN DATA AVAILABLE   ****");
    }
    m_writer.flush();
  }
}
```

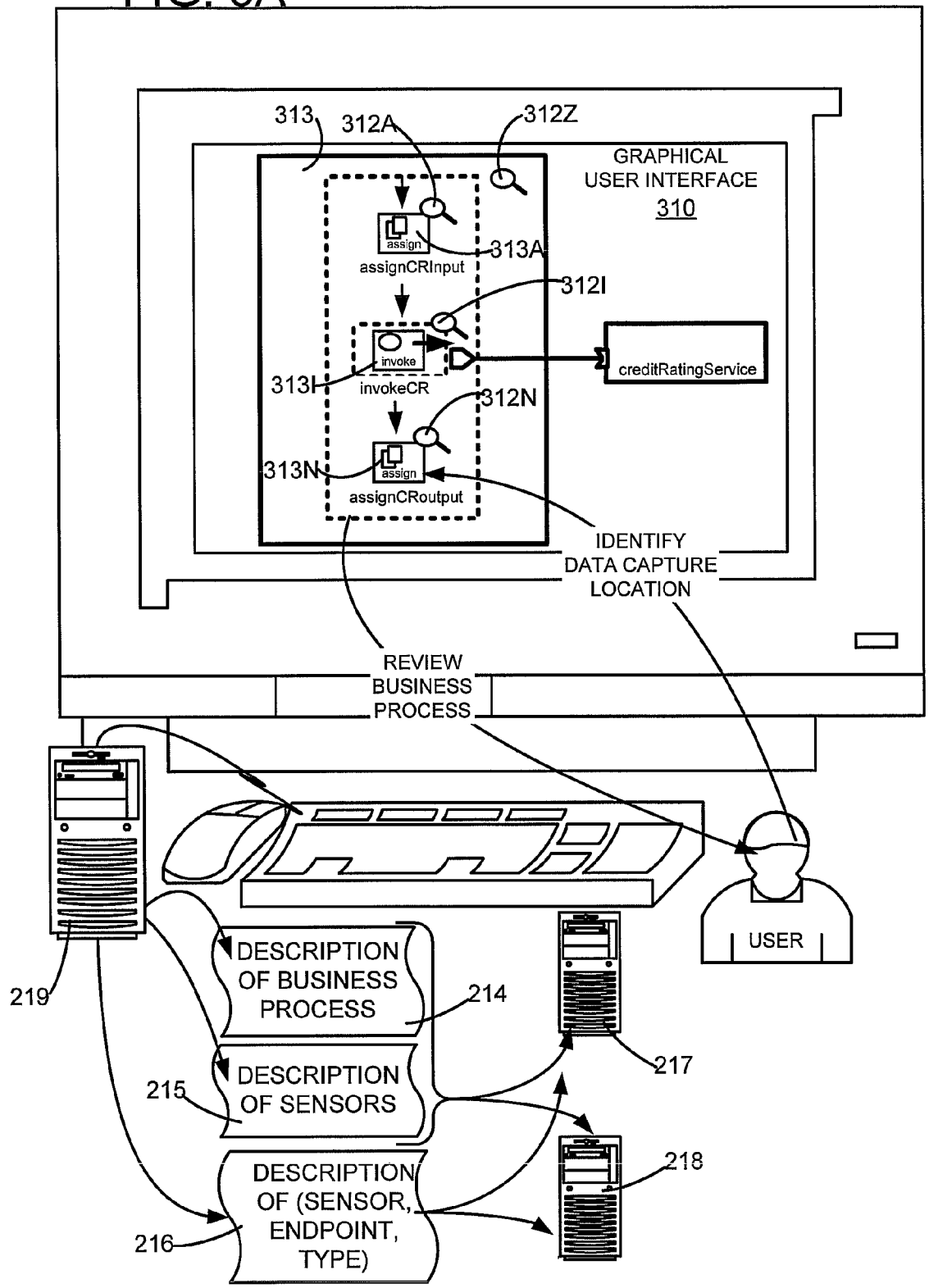

FIG. 5B

```xml
<?xml version="1.0" encoding="UTF-8"?>
<BPELSuitcase>
  <BPELProcess src="LoanFlow.bpel" id="LoanFlow"> <!-- src is the bpel source file. id is the bpel process name -->
    <partnerLinkBindings>
      <partnerLinkBinding name="client">
        <property name="wsdlLocation">LoanFlow.wsdl</property>
      </partnerLinkBinding>
      <partnerLinkBinding name="UnitedLoanService">
        <property name="wsdlLocation">LoanService.wsdl</property>
        <property name="wsdlRuntimeLocation">
        ${domain_url}/UnitedLoan/UnitedLoan?wsdl
        </property>
      </partnerLinkBinding>
      <partnerLinkBinding name="StarLoanService">
        <property name="wsdlLocation">LoanService.wsdl</property>
        <property name="wsdlRuntimeLocation">
        ${domain_url}/StarLoan/StarLoan?wsdl
        </property>
      </partnerLinkBinding>
      <partnerLinkBinding name="creditRatingService">
        <property name="wsdlLocation">CreditRatingService.wsdl</property>
        <property name="wsdlRuntimeLocation">
        ${domain_url}/CreditRatingService/CreditRatingService?wsdl
        </property>
      </partnerLinkBinding>
    </partnerLinkBindings>
    <configurations>
        <property name="sensorLocation">sensor.xml</property> <!-- identifies the file that holds the sensor definitions -->
        <property name="sensorActionLocation">sensorAction.xml</property> <!-- identifies the file that holds the sensor action definitions -->
    </configurations>
  </BPELProcess>
</BPELSuitcase>
```

CAPTURING DATA FROM USER SELECTED PORTIONS OF A BUSINESS PROCESS AND TRANSFERRING CAPTURED DATA TO USER IDENTIFIED DESTINATIONS

CROSS-REFERENCE TO PARENT APPLICATION

This application is a continuation application of U.S. application Ser. No. 11/282,977 filed on Nov. 18, 2005 now U.S. Pat. No. 7,499,951 by Ralf Mueller et al, entitled "CAPTURING DATA FROM USER SELECTED PORTIONS OF A BUSINESS PROCESS AND TRANSFERRING CAPTURED DATA TO USER IDENTIFIED DESTINATIONS" which is incorporated by reference here in its entirety.

BACKGROUND

Orchestration enables users to create new applications (typically business processes) from pre-existing applications (typically web services) that execute on different computers that are interconnected by a network, such as the Internet. A description of such a business process (that performs orchestration) may be expressed in an industry-standard language, such as WS-BPEL (Web Services Business Process Execution Language), formerly called BPEL4WS or BPEL. BPEL is being standardized by OASIS (Organization for the Advancement of Structured Information Standards) of Billerica, Mass., USA.

Visual tools to assist users in orchestration display a graphical user interface (GUI) wherein users can drag and drop certain shapes to represent pre-existing applications, and interconnect them. Use of such a tool eliminates the need for users to write software in BPEL. Visual tools that generate BPEL-compliant software include Oracle's BPEL-PM (BPEL Process Manager) 2.0, IBM's WBISF (WebSphere Business Integration Server Foundation) 5.1, Microsoft's BizTalk Server 2004, and SAP's NetWeaver.

A "business activity monitoring" (BAM) process collects data from multiple computers that are processing credit card applications, and displays the data in a user interface called a dashboard. The data may be obtained via a BAMInterceptor class of the type available in Microsoft's BizTalk Server 2002. Microsoft's BAMInterceptor class allows the application to be instrumented in a generic way, so that verbosity and content can be controlled via configuration. For more information, see the URL obtained by replacing $ with '/' in the following: hftp:$$msdn.microsoft.com$library$default.asp?url=$library$en-us$sdk$htm$frlrfmicrosoftbiztalkbameventobservationbaminterceptorclass topic.asp Microsoft describes use of BAM Interceptor as follows ("you" is the user). In each step of your application where you could have data of interest, you call Interceptor OnStep, provide an identifier for the step, and provide some data or arbitrary object that you are using in your application. You must implement a callback function so when the callback occurs, your callback procedure gets the current step ID and your data object . . . . Microsoft's BAM interceptor decides which data to request at each step, based on a configuration that you can create programmatically. . . . After you create an interceptor instance, you can store it for later use at runtime. You may keep different pre-created interceptors representing different preferences for the data and milestones for BAM. The BizTalk Orchestration Engine accommodates interception, which allows changing what data is collected for BAM at runtime using the Tracking Profile Editor.

Note that Microsoft's BizTalk appears to requires its users (i.e. process designers) to manually modify their source code (i.e. edit software) for a business process to add the BAM interceptor, and to redeploy such a modified process. Microsoft also appears to require its process designers to manually program a callback procedure which must receive and process a current step ID and a data object from the modified process.

US Patent Publication 2003/0225769 filed by Chkodrov et al. on May 31, 2002 as application Ser. No. 10/157,968, assigned to Microsoft and entitled "Support for real-time queries concerning current state, data and history of a process" is incorporated by reference herein in its entirety. This publication describes defining interesting portions of a workflow of a business or other type of process. Using a tracking profile editor, a portion of a given workflow is selected and associated with a named process part. A profile is generated based on the given workflow and selected items of payload data. The output of the tracking profile editor may be saved, for example, as an XML file. A tracking profile compiler receives the created tracking profile and generates a star schema, a flattened view and OLAP cube based on the tracking profile. Note that Chkodrov's Tracking Profile appears to be limited to BAM.

US Patent Publication 2003/0225769 states that an interceptor receives each event or payload data of interest, checks the interceptor configuration to determine whether the event is an event of interest or whether the payload data is payload data of interest, and if so, serializes the event or payload data, along with a timestamp, into a tracking stream. A tracking service extracts information pertaining to the monitored events from the tracking stream and stores the information in a queryable database. The tracking service continually monitors the tracking stream and processes events, calling a proper stored procedure to store information pertaining to events in the database. Alternatively, each event may have a specific event number and a hash table may be accessed using the event number to select an address of a stored procedure to execute.

The above-described US Patent Publication 2003/0225769 refers to US Patent Publication 2003/0225820 which was also filed by Chkodrov et al. on May 31, 2002 as application Ser. No. 10/160,844 entitled "System and method for collecting and storing event data from distributed transactional applications" which is also incorporated by reference herein in its entirety. For background on related technologies, see US Patent Publication 2004/0176968 by Syed, et al. on Mar. 7, 2003 and entitled "Systems and methods for dynamically configuring business processes" also incorporated by reference herein in its entirety.

For more background, see US Patent Publication 2005/0049924 by DeBettencourt et al. filed on Aug. 27, 2003 and entitled "Techniques for use with application monitoring to obtain transaction data"; See also US Patent Publication 2005/0071243 by Somasekaran et al. filed on Sep. 30, 2003 and entitled "Non-disruptive business process debugging and analysis"; see also US Patent Publication 2003/0115334 by Bhat et al. entitled "Business transaction monitoring system and method" filed Nov. 4, 2002; see also US Patent Publication 2002/0038228 by Waldorf et al. entitled "Systems and methods for analyzing business processes" filed Mar. 28, 2001; all of the just-described patent publications (in this paragraph) are incorporated by reference herein in their entirety.

SUMMARY

In accordance with the invention, a graphical user interface (GUI) displays a flow of portions of a business process, such as activities, from which capture of data is possible. The GUI receives, in one or more operations, at least an indication of a business process portion from which data is to be captured ("sensor"), as well as an identification of an destination to which captured data is to be transferred and a type of the destination (which identifies, through a mapping, a predetermined software). A sensor may be added any number of times (through a single GUI or though multiple GUIs) by repeatedly performing the operation. Also, a given sensor may be associated with any number of destinations (also called "endpoints").

Definitions of sensors (which describe the business process portion to be monitored), and destination identification and type (together called "sensor action") are prepared by a GUI of some embodiments and transmitted to one or more computers that execute the business process. Computer(s) executing the business process in accordance with the invention check whether or not a sensor is present, on execution of a business process portion, and if present, then execute the corresponding predetermined software(s) to transfer data from the sensor directly to the respective destination(s).

Sensors in accordance with the invention can be of one or more of the following kinds: (1) activity sensors which monitor execution of activities within a business process (e.g. execution time of an invoke activity or variable values modified as a result of executing the activity) (2) fault sensors that monitor occurrence of faults within the business process (e.g. divide by zero), and (3) variable sensors that monitor variables (or parts thereof) of the business process (e.g. input and/or output data of the business process). Moreover, sensor actions can be used to transfer data being captured (by presence of a sensor), to one or more of the following types of destinations: (1) queue, (2) database, and (3) custom. A given sensor can be associated with any number of sensor actions and vice versa, depending on the embodiment.

BRIEF DESCRIPTION OF THE FIGURES

FIG. 2A illustrates, in a high-level block diagram, several software components that are implemented in some embodiments of the method of FIG. 1C.

FIG. 3A-3C illustrate a computer in one exemplary embodiment that performs the method of FIG. 1A, including a graphical user interface (GUI) to receive the identification of a sensor.

FIG. 3D illustrates a definition of a sensor in one exemplary embodiment that is expressed in an eXtensible Markup Language (XML) in accordance with the invention, including values for a name of the sensor, a name of the class, a kind of the sensor and a target of the sensor enclosed between an opening tag and a closing tag.

FIG. 3E illustrates a schema with which the sensor definition of FIG. 3D is in accordance in some embodiments of the invention.

FIG. 3F illustrates the GUI in the computer of FIG. 3A wherein the presence of the sensor of FIG. 3D is shown by an icon 112I.

FIGS. 4A, 4B, 4G, 4I, and 4K illustrate screens of the GUI in the exemplary embodiment, similar to the screen in FIG. 3C, for receipt from the user of configuration information regarding the identity and type of destinations that are to receive the data being captured as described in sensor definitions.

FIGS. 4C, 4H, 4J and 4L illustrate definitions of sensor actions, similar to the sensor definitions of FIG. 3D, holding the values of destination identity and destination type received in the additional screens of FIGS. 4A, 4G, 4I and 4K respectively.

FIG. 4D illustrates a definition of a tuple (including a sensor's identity and a sensor action) that is used in some embodiments of the invention.

FIG. 4E illustrates data captured in one exemplary embodiment, in response receipt of a tuple illustrated in FIG. 4D.

FIG. 4F illustrates a schema in accordance with which the data in FIG. 4E is articulated.

FIG. 4M illustrates, instructions in the Java language that are used as custom software by a user when identifying a destination to be of type "custom".

FIG. 5A illustrates the GUI in the computer of FIG. 3A wherein the presence of multiple sensors is shown by respective icons 112A-112N and 112Z.

FIG. 5B illustrates a deployment descriptor that is used in some embodiments of the invention to identify the names of files containing sensor definitions and sensor action definitions, to a computer that executes the business process.

DETAILED DESCRIPTION

Figure 1A:
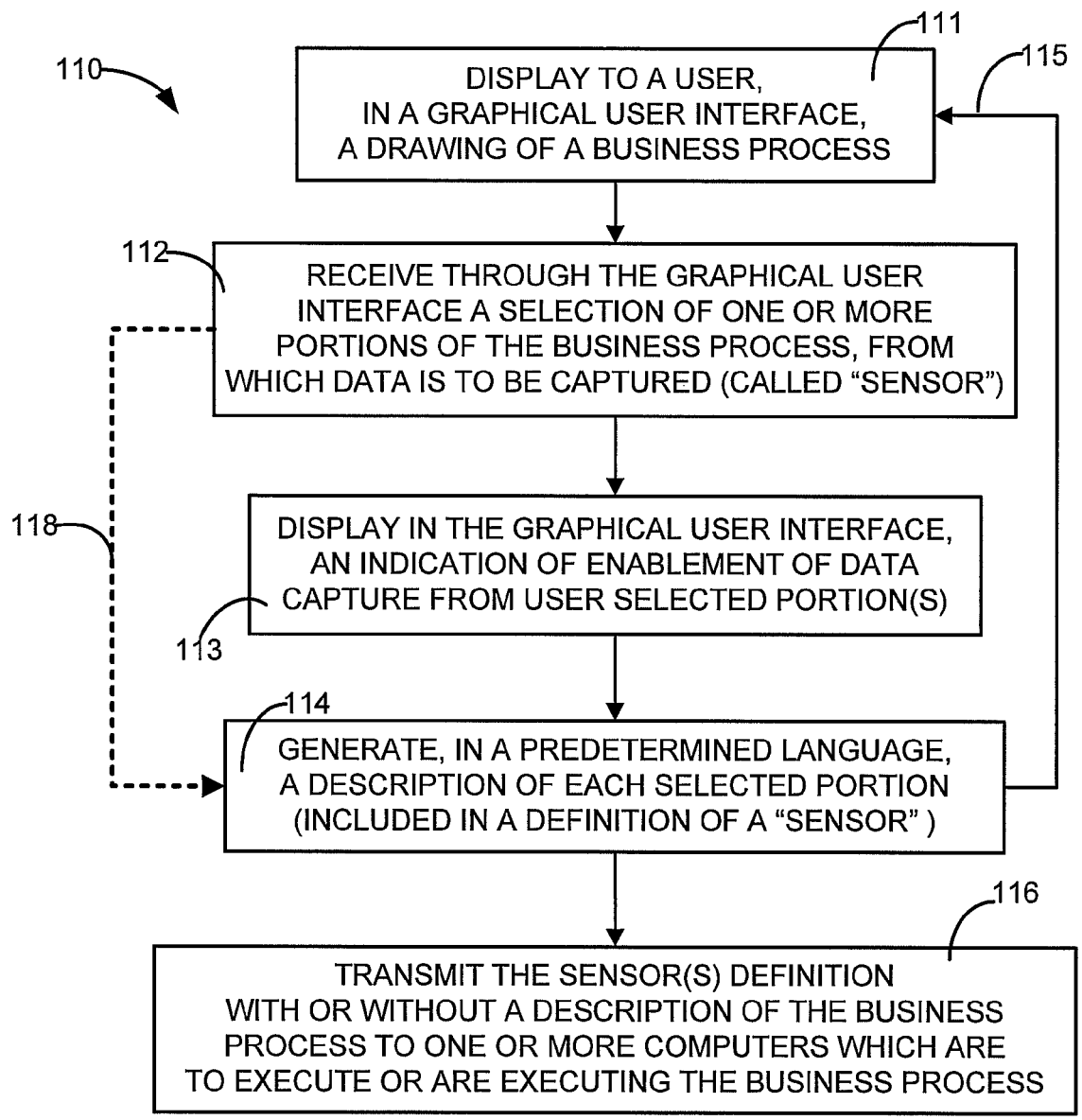
FIGS. 1A and 1B illustrate, in flow charts, two computer-implemented methods 110 and 120 in accordance with the invention that automatically prepare descriptions on receipt from a user of an indication of a portion of a business process (also called "sensor") from which data is to be captured (in method 110), and indication of a destination to which captured data is to be transferred (in method 120) respectively.

In accordance with the invention, a computer is programmed with an illustrative method 110 to use a graphical user interface (GUI) to display (as per act 111 in FIG. 1A) a drawing of activities of a business process (e.g. in a flow chart), and receive (as per act 112) through the GUI a selection of any portion thereof (called "sensor") from which capture of data is to be performed. For example, a human ("user") may simply point and click on any portion of the business process shown in the drawing, such as a single activity or several activities grouped into a structured activity, or a variable or a fault. Note that a user can identify any portion of a business process as being suitable for capture of data therefrom. In response to such user input, the computer displays (as per act 113) an indication in the GUI that a sensor is now associated with the user-selected portion of the business process. The computer (hereinafter "GUI computer") is further programmed to automatically generate (as per act 114) a definition of the sensor, expressed as, for example, metadata in an industry-standard format, such as XML.

A sensor definition typically includes at least an identification of an activity within the business process, and optionally also includes an identification of the business process itself. Depending on the embodiment, the sensor definition may also include additional values that may be identified in a similar manner (by user selecting an item from a displayed figure) or alternatively by a user typing in such additional values. Examples of additional values include the "kind" of event that is to trigger a sensor and the data structure being targeted whose data is to be captured at the sensor.

In one illustrative embodiment, the GUI computer displays in act 113 an icon in the form of a magnifying lens adjacent to a business process portion whose data is to be captured. Instead of an icon any other indication, may be made by the GUI computer to acknowledge the user's interest in a business process portion, e.g. by changing the color of the activity to a predetermined color and/or changing any other attribute such as brightness of the activity, in the drawing of the business process.

In embodiments wherein the GUI computer is different from another computer that executes the business process, the sensor definition is transferred therebetween (as per act 116). On receipt of the sensor definition, one or more computer(s) executing the business process, begin to collect data of interest to the user. Specifically, such business process computer(s) of some embodiments check sensor definition(s) on execution of each portion of the business process (e.g. before and/or after execution of each activity), and collect data of interest to the user as indicated in the sensor definition(s).

While in some embodiments, after act 114 (FIG. 1A), the GUI computer proceeds directly to act 116, in several embodiments the GUI computer returns to act 111 as per branch 115 (FIG. 1A) to permit the user to identify additional sensors. Moreover, although in some embodiments, after act 112 the computer proceeds to act 113, in other embodiments, the computer goes directly to act 114 as per branch 118 (FIG. 1A) in which case the display is not updated until after the description of the user-selected portion (in a sensor definition) is generated in act 114. Therefore, a specific order of performance of acts 111-116 relative to one another may be different, depending on the embodiment. Hence, several such embodiments will be apparent to the skilled artisan in view of this disclosure.

In some embodiments, the sensor definition is transferred (in act 116) along with a transfer of the description of the business process (which may be, e.g. expressed in WS-BPEL) from the GUI computer to one or more business process computer(s), i.e. during deployment of the business process. In such embodiments, a change in sensor definition requires re-deployment of the business process. In other embodiments, the sensor definition is transferred independent of transfer of the business process description. The GUI computers of such other embodiments accept identification of a sensor even at run time, i.e. after deployment of a business process, and the corresponding business process computers dynamically process changes to sensors during execution of the business process, thereby to eliminate the need to re-deploy a modified business process. Also, many embodiments permit one or more users to add a sensor (for a given activity or variable as per 381C in FIG. 1C, or fault) any number of times (e.g. through a single GUI or though multiple GUIs) by repeatedly performing sensor addition.

Identification of sensors through a GUI as per acts 111-112 and automatic generation of one or more sensor definition(s) as per act 114 eliminates the need to manually change software to add an interceptor to invoke a callback procedure, as required in the prior art described in the Background section above. Specifically, a GUI as described herein allows a user who is not a programmer to set up one or more sensors by using a pointing device (e.g. point and click or drag and drop), which is a significant improvement over a prior art requirement for a programmer to modify source code and write a callback procedure. Note further that in some embodiments, a user who is not a programmer may still manually prepare definition of a sensor on their own, bypassing the GUI.

In some embodiments, the data captured as specified in a sensor is stored in a predetermined format and/or in a predetermined data store, while in other embodiments, the captured data is transferred to one or more destinations that are user configurable and/or in a format that is user configurable. Specifically, in some illustrative embodiments, a GUI computer of the type described above in reference to FIG. 1A receives from the user one or more attributes of the destinations, e.g. identity of queues and/or databases and/or format of the data, and prepares one or more descriptions of the destinations containing such configuration information (to generate a sensor action definition) as described next in reference to method 120 of FIG. 1B.

In act 121 (FIG. 1B) the GUI computer displays a screen and receives via fields in the screen one or more attributes, such as the identity of a destination (e.g. in the form of an XPATH expression) and a type of the destination (e.g. queue or database or custom in case of user-defined software interface), to which captured data is to be transmitted (called "sensor action"). Next, in act 122, the GUI computer generates a description of the configuration information received in act 121 (called "sensor action definition"). Note that after act 122, while the GUI computer goes to act 123 in some embodiments, in other embodiments the GUI computer returns to act 121. Furthermore each of acts 121 and 122 may be repeated any number of times.

In act 123, the GUI computer displays another screen and receives via fields in the screen one or more correlations, between each sensor and one or more sensor actions. Note that a given sensor of a given business process may be associated in act 123 with any number of (i.e. one or more) sensor actions. Next, in act 124 the GUI computer generates a description of one or more correlations received in act 123. In act 124, the GUI computer may additionally generate the definition of any sensor actions that were not previously generated (e.g. in act 122). Then, in act 125 the GUI computer transmits the definitions that were prepared in act 122 and/or act 124 to one or more business process computers, thereby to notify these computers to transfer any collected data in accordance with configuration specified in the definitions.

In some embodiments, the GUI computer prepares a description of associations together with sensor actions, in a single file in act 124 although in other embodiments the sensor actions are described in one file (generated in act 122) that is separate and distinct from another file containing the description of associations (generated in act 124). Furthermore, in some embodiments, the GUI computer prepares a single file containing various descriptions, e.g. definitions of each of sensors, sensor actions and associations. Moreover, in some embodiments, all of the configuration information described above in reference to sensors and sensor actions is received in a single operation although in other embodiments such information can be received in any relative order. For example, all sensors may be configured via the GUI in a first loop, all sensor actions may be configured via the GUI in a second loop, and all associations between sensors and sensor actions may be configured via the GUI in a third loop, with the first two loops being executed in any order relative to one another, followed by the third loop.

In many embodiments, two attributes of a sensor action that are supplied to a GUI computer by the user at runtime (during execution of the business process) are: (1) an identification of a destination to which captured data is to be transferred and (2) a type of the destination, which is selected from a predetermined set of types. Each sensor action type that is selectable by the user is previously associated with and uniquely identifies (through a predetermined mapping) a predetermined software to be executed (to perform at least one action) when transferring information to the identified destination. Identification of predetermined software and one or more destination(s) via corresponding fields in the graphical user interface eliminates the need for a user (when enabling data capture) to write their own procedure as required by prior art. Hence a GUI computer of the type described above is simpler and more user-friendly than prior art.

A computer that executes a business process in accordance with the invention is responsive to receipt of sensors, sensor actions and associations therebetween. Specifically, the computer is programmed as illustrated in method 130 to check (as per act 131 in FIG. 1C) if a sensor is present on execution of each portion of a business process (e.g. on execution of each activity, such as an invoke activity, a receive activity, and a throw activity). If a sensor is present, the business process computer automatically performs capture of data (as per act 132) as specified in the sensor definition. The captured data is transferred directly by the business process computer (as per act 133) to one or more destination(s) as identified in the corresponding associations, by executing predetermined software(s), e.g. identified from the type of the destination(s). Transfer of data to one or more destinations directly by the business process computer eliminates the need to access a database to store data or to retrieve stored procedures.

As noted above, a business process computer of some embodiments transfers captured data by execution of predetermined software that is identified in sensor action definition(s). A user may select such software implicitly, e.g. by identifying in a GUI (via "drag-drop" or "point-click" action on a pointing device such as a mouse), a type of destination for receipt of capture data as being, for example, a database or a queue, wherein each type is associated with its own software that is predetermined, e.g. written ahead of time. A destination's type is also referred to as "publish type." Such GUI-based selection of a publish type by the user eliminates the need for the user to write software for a destination, for whose type such software already exists. Several such embodiments implement tight integration (the UI software and the runtime software) with business process modeling.

Figure 1B:
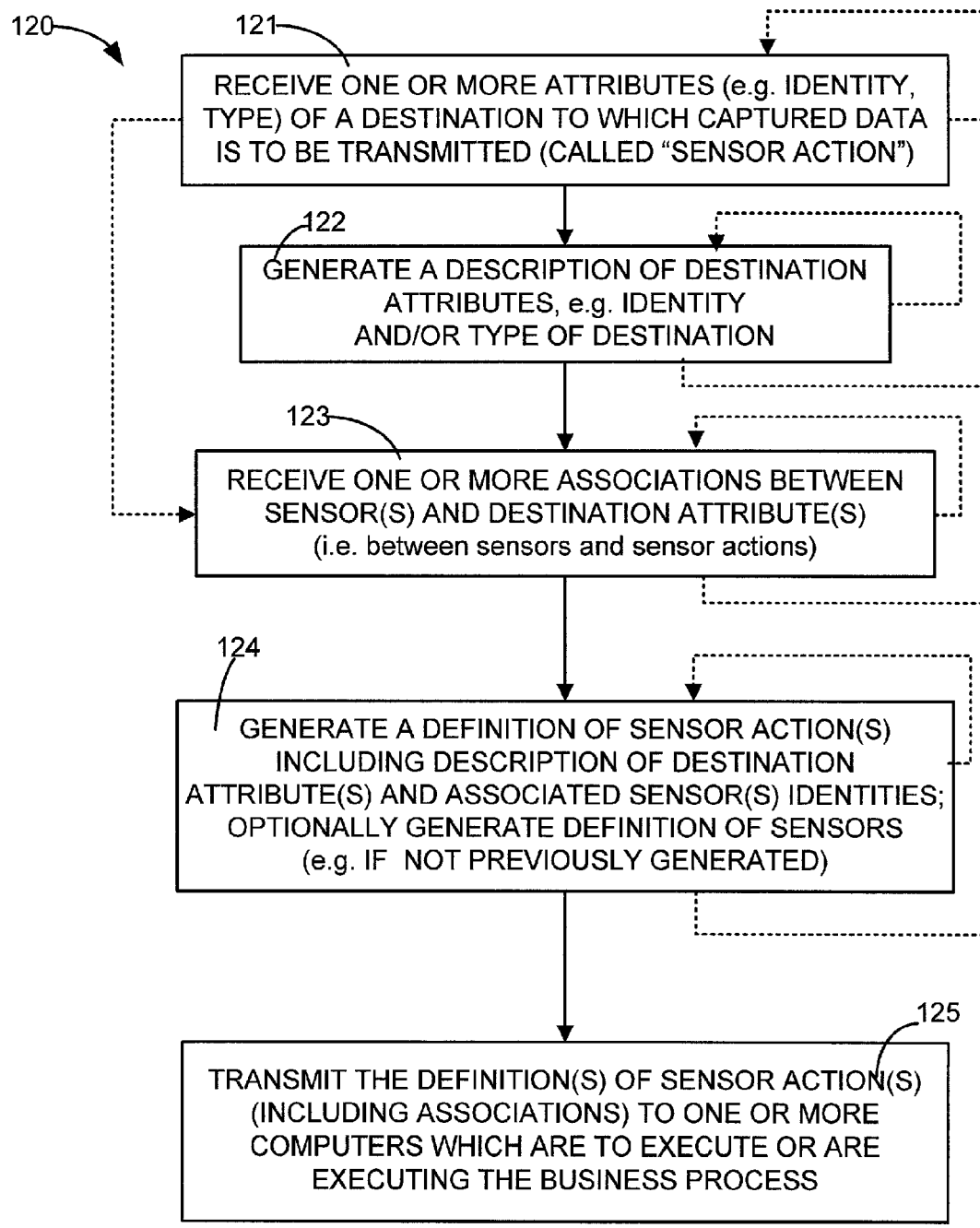
Figure 1C:
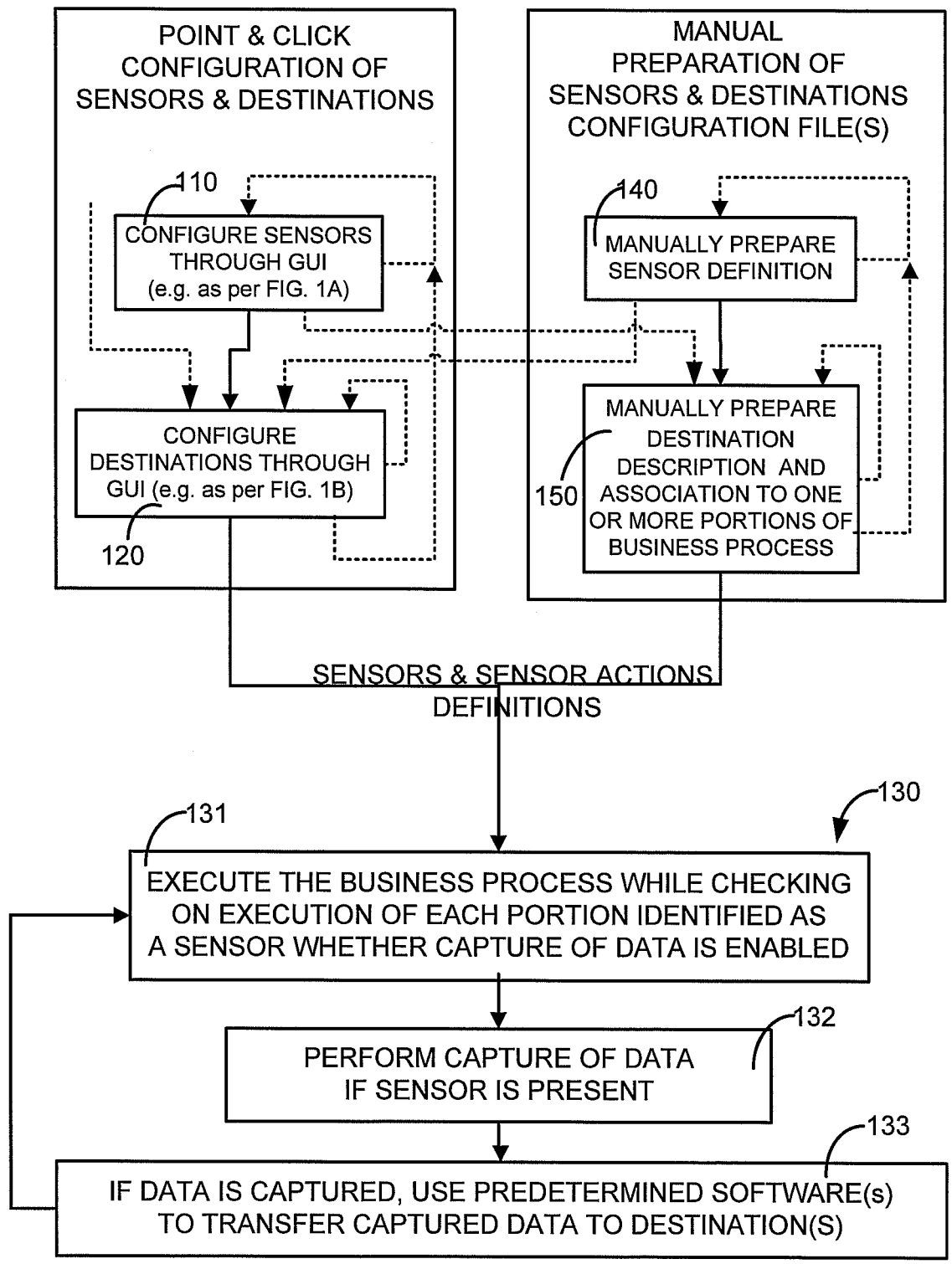
FIG. 1C illustrates, in a flow chart, a method of some embodiments that is performed by one or more computers executing a business process, to perform user-indicated data capture and to transfer the captured data to one or more user-indicated destination(s).

In alternative embodiments, instead of using a GUI, sensor definitions and/or sensor action definitions may be manually prepared, as per acts 140 and 150 (FIG. 1C). Manual preparation of such definitions does not require any programming skills because the definition of sensors and/or sensor actions merely contains descriptions of configuration information, such as the identity of an activity whose data is to be captured and/or the identity of a destination to which the data is to be transferred. As the definitions in many embodiments are expressed in a human-readable language, such as the eXtensible Markup Language (XML), the definitions can be prepared as, e.g. descriptions of the business process portion being monitored and/or data to be captured and/or software to be executed and/or destinations to which captured data is to be transferred, in a simple text editor in conformance with predetermined schema(s) for sensors and/or sensor actions. Hence, such embodiments are completely meta-data driven and no coding skills are required (other than to understand schema) to write the definitions of sensors and/or sensor actions. Note that in other embodiments definitions of sensors and/or sensor actions may be expressed in languages that are not human understandable, and a parser or other such software tool may be required for a human to review and/or modify the definitions.

In some embodiments, software which handles captured data applies a filter (that may be user configured), when accepting the captured data for transfer to a destination. Alternatively, or in addition, such software of some embodiments uses an industry standard interface to transfer the captured data to the destination (that is user configured), e.g. by sending messages, via Java Messaging Service (JMS). The captured data may be additionally or alternatively transferred using another industry standard interface to store/retrieve data, such as Java Database Connectivity (JDBC) API for cross-DBMS connectivity to a wide range of SQL databases and access to other tabular data sources, such as spreadsheets or flat files.

Sensors and sensor actions of some embodiments as illustrated in FIGS. 1A-1C differ from prior art in a number of ways, as discussed next. Sensors in many embodiments are completely meta-data driven, and require no code to be written. Specifically, a designer of the business process can remain completely unaware of the presence or absence of such sensors. In such embodiments, sensors are overlayed on top of a business process (e.g. via a GUI), by users interested in monitoring the process. The overlay implementation allows sensors to be easily added or removed (or enabled/disabled) without modifying an already deployed process, independent of the lifecycle of the business process.

Moreover, overlay is implemented in some embodiments by updating sensors and/or sensor actions in a computer that is executing the business process, in a store therein that is independent of business process execution, such that changes to the store do not require the business process to be stopped and re-started. Hence, changes to sensors and sensor actions are implemented on the fly in such embodiments, without affecting (or only minimally affecting) the real-time execution of a business process. In contrast, the prior art interceptors described in the Background section above appear to require the process designer to make changes to the business process itself, to enable the business process to be monitored. Hence, prior art interceptors are intrusive and inflexible because if changed, the business process must be modified and redeployed.

Moreover, prior art interceptors as described in the Background section above, are believed to be limited to sending their captured data to a single destination, namely the BAM product. In contrast, sensor actions as described herein can be configured (through a GUI) to selectively capture data and to publish selections of captured data to a database, and/or to reports, and/or to Java Messaging Service (JMS) destinations (e.g. queues or topics), and/or BAM. Therefore, depending on configuration, data may be captured, for example, only when the data satisfies one or more user-specified criteria of the sensor. In contrast, prior art described in the Background section above transfers a complete data object to an interceptor written by the user, and the user's interceptor has to evaluate the data object for compliance with such criteria. Depending on the embodiment, a sensor action may even be configured (through the GUI) to contain one or more user-provided callback procedures, which therefore allows the captured data to be sent to any computer, including a computer that generates BPEL reports.

Furthermore, sensors and sensor actions of some embodiments as illustrated in FIGS. 1A-1C differ from debuggers in a number of ways, as discussed next. As noted above, sensors in many embodiments are implemented as an overlay, so that the business process itself remains unchanged regardless of what data is being captured. In contrast, debuggers are intrusive because they attach to the process. Furthermore, debugger breakpoints generally slow down the process being debugged significantly, which limits the use of debuggers primarily for testing purposes. One cannot have a debugger attached to a production process. In contrast, sensors have a very slight performance impact on the business process being monitored, when implemented by overlaying on executing production processes for continuous monitoring.

Also, a debugger (to the inventors' knowledge) attaches to a specific instance of an executing process or program.—i.e. one cannot have a debugger monitor all instances at the same time—since each process has different values for the same variable. However, a sensor of most embodiments may be transmitted to all computers that are running instances of a business process, to monitor all instances thereof. Moreover, a debugger (to the inventors' knowledge) does not have a mechanism to publish data to external systems after a breakpoint occurs. Specifically, most debuggers known to the inventors display the data of the variables only within a user interface of the debugger itself. In contrast, a sensor of the type described herein can be associated with a sensor action that sends out not only the sensor data but also other system data such as "process name, timestamp, machine name, datatype" etc to the publisher (JMS, database, custom etc.)

Finally, note that debuggers generally (to the inventors' knowledge) do not maintain any state information across breakpoints. In contrast, sensors of some embodiments can be configured to track various types of information over time, such as the time taken (i.e. duration) to execute an activity. In one such example, an activity sensor of several embodiments is triggered at the start and at the end of an activity (as well as on occurrence of any event such as a re-trial of the activity), and predetermined software for the sensor action automatically computes the time required for the activity to complete (i.e. duration of the activity).

A method in accordance with the invention, as illustrated in FIGS. 1A-1C, enables the user to use a GUI to activate capture of data from a business process at a business document level. Any work done by a business process, is monitored at a very high level of abstraction, namely at the level of modeling of the business process. Therefore, a prior art requirement for the user to write their own callback function and/or stored procedure is eliminated in accordance with the invention by allowing the user to simply select a predetermined software (indirectly by specifying the destination's type), and provide the identity of the destination to which captured data is to be sent by the predetermined software. Also, as noted elsewhere herein, a user may specify a given captured data from a given sensor to be sent to multiple destinations, by associating the multiple destinations with a given sensor. Also, when creating a sensor, the user may select a predetermined software that is different (or same) for each destination, depending on a type of the destination (e.g. queue, or topic, or database).

In some embodiments, one or more computers are programmed with four softwares, namely a business process manager 222 (FIG. 2A), sensor registry 223, a data capture agency 224 and a sensor agency 225. Business process manager 222 receives each of documents 214, 215 and 216 (FIG. 2A) from business process modeler 221. On receipt these documents, business process manager 222 stores the information contained therein in a sensor registry 223 (FIG. 2A), by performing acts 231-236 and 241-244 which are described below in reference to FIG. 2B. The remaining softwares 223, 224 and 225 (together called "sensor framework") are used during execution of the business process, as described below in reference to FIG. 2C.

In some embodiments, sensor registry 223 maintains a catalog of sensors and sensor actions. The configuration of sensors and sensor actions are stored in a normalized relational schema in an Oracle Database. The sensor registry 223 of such embodiments performs the following actions: maintains sensors and sensor actions for business processes across domains, registers new sensors and sensor actions for a business process, unregisters (delete) sensors and sensor actions for some business processes, responds to queries from data capture agency 224 and sensor agency 225, and caches sensor and sensor action metadata for fast access (which are maintained in a database in non-volatile memory).

In such embodiments, data capture agency 224 is notified by business process manager 222 whenever an event happens. In response to each event, data capture agency 224 captures the appropriate data from the business process context after querying sensor registry 225 for presence of sensors and at least one associated sensor action, and sends the captured data (as specified in the respective sensor) to sensor agency 225. Note that if no sensor action is associated with a given sensor, then no data is captured which improves efficiency. Note also that if no sensor is defined, then again no data is captured, which further improves efficiency. In several embodiments, sensor agency 225 is responsible for accepting captured data from data capture agency 224, querying the sensor registry 223 for associated sensor actions, executing the predetermined software identified for the sensor actions to publish the sensor data to all of the identified destinations, and to manage custom data publishers.

Note that in the following discussion, it is assumed that acts to be performed by a business process are articulated in the language BPEL, although as would be apparent to the skilled artisan, any other language may be used.

In act 231 (FIG. 2B) of some embodiments, a business process manager 222 starts up in act 231 and after initializing one or more variables, goes to act 232. In act 232, business process manager 222 reads a descriptor of a business process to be deployed (also called "deployment descriptor") which may be expressed in the language BPEL as noted above. The deployment descriptor of some embodiments contains information whether or not sensors and sensor actions are configured for the BPEL process and if configured, provides the file name(s) of the configuration files for sensors and sensor actions. Then, in act 233, business process manager 222 uses information from the just-described descriptor to deploy the BPEL process in the business process manager 222. Then in act 224, the business process manager 222 checks if this particular BPEL process has any sensors. If not, then business process manager 222 simply goes to act 236 to check if there are any additional BPEL processes to be deployed and if so returns to act 232 and if not goes to act 237 where it waits for receipt of tuples (that identify one or more sensors as being enabled or disabled).

Figure 2B:
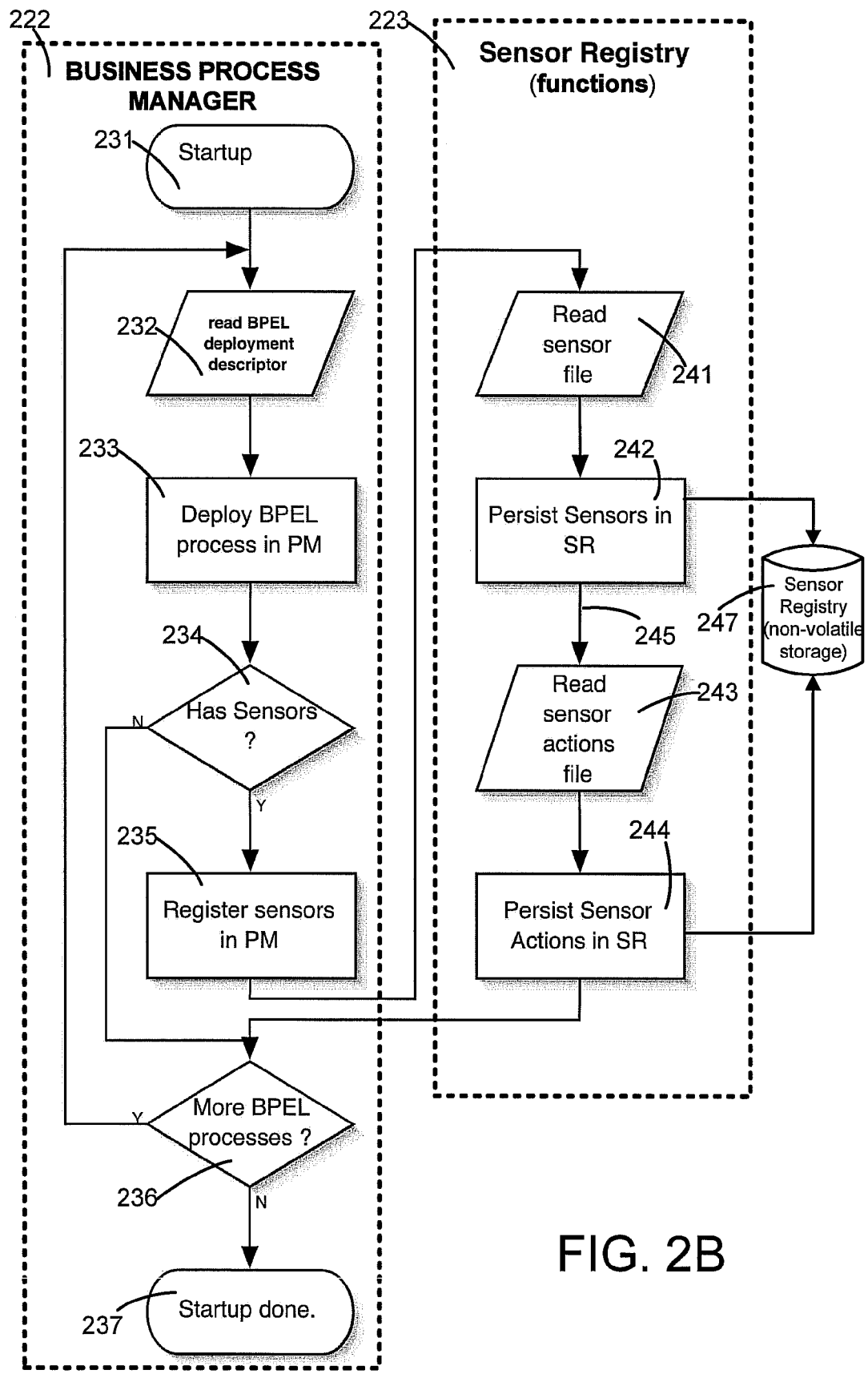
FIGS. 2B and 2C illustrate, in flow charts, acts performed in certain embodiments by the blocks illustrated in FIG. 2A, on receipt of sensor definitions, and during execution of the business process respectively.

If in act 234 (FIG. 2B) business process manager 222 finds that the current business process has one or more sensors, e.g. if a document containing sensor definition 215 exists (having the name "sensors.xml" in one embodiment), then business process manager 222 registers the sensors as per act 235 in a sensor registry. Specifically, on finding that sensors exist, sensor registry 223 is invoked which performs acts 241-244 (FIG. 2B). Note that sensor registry 223 is implemented in some embodiments via functions that are called in-line by manager 222 (i.e. the same process which executes business process manager 222 continues to execute after a context switch). However, other embodiments may implement sensor registry 223 as a separate process and/or separate thread from business process manager 222. In act 241, sensor registry 223 reads sensor document 215 and goes to act 242. In act 242, functions of the sensor registry 223 store (i.e. persist) various attributes of the sensors being defined in nonvolatile storage 247 (such as a disk) which is used as the sensor registry 223's storage.

In act 241, if a definition 216 (FIG. 2A) for sensor actions is not yet received for the current business process which is being deployed then sensor registry 223 simply returns control back to business process manager 222, which continues on to act 236 (described above). In act 242 (FIG. 2B) if sensor action definition 216 is received (e.g. at the same time as sensor definition 215) then branch 245 is followed to perform act 243. In act 243, sensor registry 223 reads each sensor action, which in some embodiments, contains at least three items namely a sensor being enabled, a destination to which data from the enabled sensor is to be transferred and a type which identifies a predetermined software to be executed, to perform the transfer to a destination of that type.

Depending on the embodiment and the implementation, such a tuple may contain one or more additional items, such as a property that identifies configuration information needed to interface with the destination and a filter that identifies a Boolean expression to be applied to the data in deciding whether or not to transfer and/or what data to transfer. Next, sensor registry 223 performs act 244 (FIG. 2B) wherein each tuple read in act 243 is stored (i.e. persisted) to non-volatile storage 247.

In act 237 (FIG. 2B) if a sensor action definition 216 is received (e.g. at a later time than the time at which sensor definition 215 is received), then as per act 249 business process manager 222 once again invokes sensor registry 223 which performs act 243 to read the tuples (i.e. the sensors and sensor actions) in definition 216 and act 244 to persist them to nonvolatile storage 247. As noted above, on completion of act 244 control returns to business process manager 222 (FIG. 2B) which once again waits to receive another definition 216 for the business process.

Figure 2C:
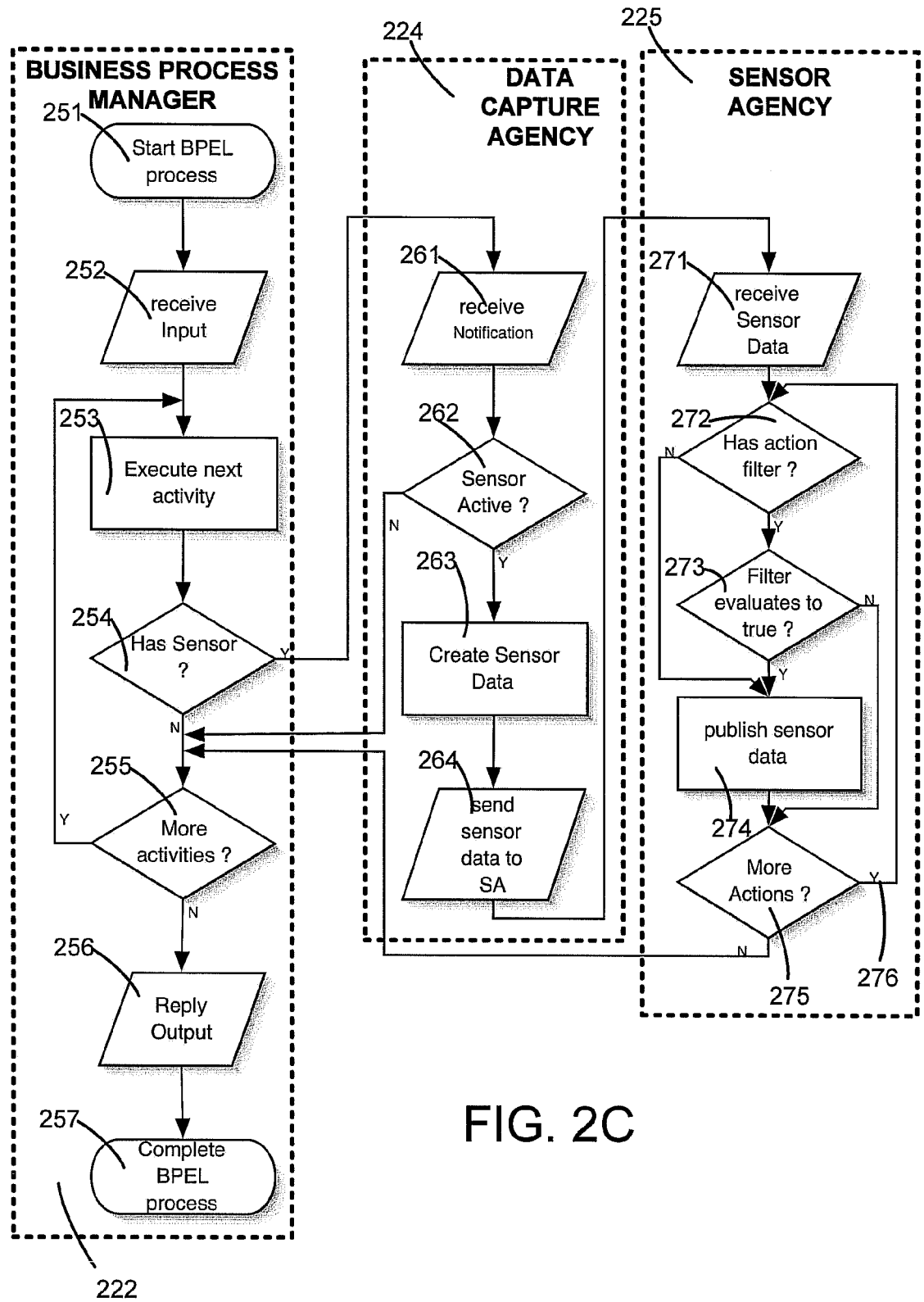

Referring to FIG. 2C, a business process 213 is executed in computers 117 and 118 by business process manager 222, which performs acts 251-257 as follows. Specifically, in act 251, business process manager 222 starts up business process 213. Next, business process 213 waits to receive input, as illustrated by act 252. When input is received, the business process performs act 253, to execute a next activity that uses the input, wherein the next activity is identified in a process definition 214 (which is expressed in the language BPEL in some embodiments). On completion of act 253, the business process manager 222 does not go to act 255 as may be done in the prior art. Instead, on completion of act 253, business process manager 222 goes to act 254 to check whether or not a sensor is present.

In act 254, if a sensor is not present, then control transfers to act 255 wherein business process manager 222 checks if there are any more activities to be performed (as per definition 214) and if so returns to act 253 (described above). If there are no more activities to be performed then business process manager 222 goes to act 256 to generate output to be sent in a reply, and thereafter goes to act 257 that completes execution of business process 213.

In act 254, if business process manager 222 finds that there is a sensor present in any portion of the activity executed in act 253 then the software piece "data capture agency" 224 is invoked in line (in some embodiments although in other embodiments software piece 224 may be run as a separate thread). In act 261, the data capture agency 224 receives a notification of the sensor being present. The embodiment illustrated in FIG. 2C supports enabling and disabling of sensors, and hence in act 262, the data capture agency 224 checks if the sensor is enabled in which case data needs to be collected. In some embodiments, enablement of a sensor is programmatically determined by the data capture agency 224 via a hash table which uses the sensor name as key.

If the answer in act 262 is no, then data capture agency 224 returns control to the business process manager 222, e.g. in act 255 (described above). If the answer in act 262 is yes, then the data capture agency 224 performs act 263 to capture the data from this sensor, and thereafter proceeds to act 264. In act 264, the data capture agency 224 uses the captured data to invoke another software piece, namely "sensor agency" 225. Sensor agency 225 of several embodiments is invoked as an in-line function by data capture agency 224 in which case act 255 is performed only after completion of acts 271-275. Delay between performance of acts 264 and 255 may be reduced by using as endpoints a JMS queue and/or topic. In alternative embodiments, sensor agency 225 may be implemented as a separate process and/or separate thread from data capture agency 224.

In act 271, the sensor agency 225 receives the captured data from data capture agency 224. Next, in act 272, sensor agency 225 checks a sensor action associated with the sensor, to see if a filter is present therein for use in transferring the captured data. If not then control transfers to act 274 (described below). If in act 272, data capture agency 224 determines that a filter is present, then control transfers to act 273 wherein appropriate data is inserted into a Boolean condition. If this Boolean condition is not true, then control transfers to act 275 (described below).

If in act 273, sensor agency 225 determines that the Boolean condition is true, then control transfers to act 274 to transfer (e.g. by publishing) the captured data to one or more destination(s) identified in the tuples description in sensor action definition 216 (FIG. 2A). When performing act 274, the sensor agency 225 is further programmed to identify and execute one of predetermined softwares 226A and 226B (FIG. 2A), to effectuate the transfer of captured data. A predetermined software to be executed at this stage is identified by use of the destination's type from the tuple, with a mapping of the destination type to the predetermined software.

Such a mapping is hardcoded in software of some embodiments (e.g. in a switch-case statement) in which the number of destination types is small (e.g. 3-4). In alternative embodiments, a mapping between a destination type and the interface software for that destination type is implemented in a table of a relational database or by use of a hash function, when the number of endpoint types is large (e.g. 10-15). In the exemplary embodiment illustrated in FIG. 2A, if the destination type was queue type, then predetermined software 226A (which is queue interface software) is automatically selected by use of the mapping (i.e. without any user input other than their input of endpoint type), and this software is then executed to effectuate the transfer of captured data.

Predetermined software 226A can be used to send data to any of destinations 229A-229M (wherein $A \leq J \leq M$), because all these destinations are of type queue. Hence, when invoking predetermined software 226A to interface with a destination, the sensor agency 225 passes to it a specific identity of the destination which was identified by the user when enabling the sensor. An identified destination 229A may be located in, for example, a business activity monitor (BAM) computer 299 which may contain other destinations which are of the same type or different type, such as a database 227P.

Additional destinations 229J, 229M, 227Q, and 227R to which captured data may be transferred, can be located in other computers, such as a warehouse builder, an enterprise manager and a web portal.

Queue interface software 226A handles any destination which is of queue type and hence software 226A can be used to send information to any destination which is of type queue, such as queues 229A-229M, depending on an identity with which software 226A is invoked. In FIG. 2A, software 226A receives an identity of queue 229A from sensor agency 225, and hence sends captured data to queue 229A (as shown by the solid line 298). Similarly, software 226B is used to transfer data to any destination which is of type database, such as any of databases 227P-227R (as indicated by a dashed line 297). Software 226B is identified for use with such destinations when the user indicates that the sensor's data is to be transferred is to a destination of type "database" and also provides an identity of one of databases 227P-227R.

In addition, a user may supply their own custom software 226C for use in interfacing to any type of destination not already supported, such as an email server 228Z (e.g. if the captured data is to be sent by email). Although some embodiments as just described enable a user to identify any one of several databases 227P-227R as the destination of the data being captured, other embodiments enable the user to select merely the type to be database (i.e. without requiring the user to specify an identity of the database as illustrated in FIG. 5A). In such a case, the captured data is persisted in a database of a default name and located at a default location. As noted above, softwares 226A and 226B are written ahead of time prior to the user's selection of a destination's type, and hence are available during execution of a business process to automatically send data to destinations of the respective types.

In some embodiments, predetermined software to be executed for a sensor action is identified from the publish type as follows. If 'publish type' (looked up in the sensor registry for the current sensor action) is equal to 'JMSTopic' or 'JMS-Queue' then J2EE JNDI mechanism is used to identify the underlying JMS queue or topic given its name in the property 'Publish Target'. If publish type is equal to 'Database', the predetermined software is a database publisher which is provided to the sensor agency at startup (in its initialization file). If publish type is 'Custom', the predetermined software is identified by a Java Class Name provided in property 'Publish Target'.

While embodiments having a small number of publish types may use a series of if statements as just described, other embodiments that support a large number of publish types use an in-memory hash table for fast lookup. One or more such hash tables may be initially (at startup) retrieved from non-volatile memory of sensor registry 223 (wherein initial versions of hash tables may be stored prior to execution of the business process). Note that the hash tables may be modified (i.e. re-configured) during execution, e.g. when sensor and/or sensor action definitions are received and/or if a business process is re-deployed.

When invoking a predetermined software 226A, sensor agency 225 passes to it the location of data which has been captured and needs to be transferred as well as the name of the destination (i.e. endpoint) to which the data is to be transferred. In embodiments that receive any additional attributes of the destination from the user (such as a property or a filter), the additional attributes are also supplied to the predetermined software. In some embodiments, all such information is stored in a block, and an address of the block is passed to the predetermined software 226A.

In several embodiments, the block contains header information (e.g. as shown in the top half of FIG. 4E) appended to the captured data, for use in identifying the entity that captured the data, such as process name, process instance, application server mid-tier instance, exact timestamp when the data was captured, and identity of event that triggered the data capture. In alternative embodiments, such information is simply placed on a stack and a context switch is performed by sensor agency 225, thereby to begin execution of predetermined software 226A (i.e. perform act 274 in FIG. 2C).

On completion of execution of the predetermined software, sensor agency 225 completes act 274 and goes to act 275 to check if there are any more destinations to which the captured data is to be transferred and if so then sensor agency 225 takes branch 276 and returns to act 272 (described above). Act 275 implements support for multiple sensor actions for a given sensor, as shown by the presence of branch 276 in box 225. Moreover, act 274 provides support for user-selectable software to be performed in a sensor action.

As noted above, sensor registry 223 of some embodiments maintains a hash table (in memory or cache) that maps a sensor to its sensor actions. In one embodiment, the hash table uses as key a given sensor name, and as value a list of sensor actions for the given sensor name. Sensor registry 223 of such embodiments also provides functions that access the hash table to retrieve a list of destinations for a given sensor, e.g. Boolean hasSensorAction(String sensorName) and List getSensorActions(String sensorName).

Note that the number of additional destinations associated with a given sensor (whose data has been captured) determines the number of times that branch 276 is taken. When the captured sensor data has been transferred to all destinations associated with the given sensor, then branch 277 is taken to return to act 255 in the business process manager 222, which then continues its execution of the business process 213 (as described above).

A graphical user interface (GUI) 310 (FIG. 3A) of a business process modeler (BPM) in some embodiments of such a computer 319 (FIG. 3A) displays (as per act 111 in FIG. 1A) each sensor that exists, overlaid on a drawing of business process 313. A sensor may be identified by, for example, an icon 312I (FIG. 3A) of a magnifying lens that is shown adjacent to a business process portion 313I such as an activity from which data is to be captured. Depending on the embodiment, identification of each sensor by the GUI may be performed in any manner, e.g. by highlighting business process portion 313I (in a predetermined color such as red for a disabled sensor and green for an enabled sensor) instead of or in addition to icons 312I.

A user of GUI 310 may supply the configuration information in act 112 (FIG. 1A) even after a business process 313 has been deployed (e.g. while it is executing), because sensors can be created at any time in the embodiments illustrated in FIGS. 1A-1C. Specifically, the user can identify which (if any) of the portions 313A-313IN in business process 313 is to be monitored, i.e. to start the capture of data therefrom. In some embodiments, no further detail is needed to define a sensor, i.e. other than to select a business process portion whereby the GUI computer automatically assigns a name to the sensor and makes note of the activity (or other portion) of the business process that is to be monitored. Such embodiments may send the captured data to a default destination, and permit the user to override the default in another screen.

Figure 3B:
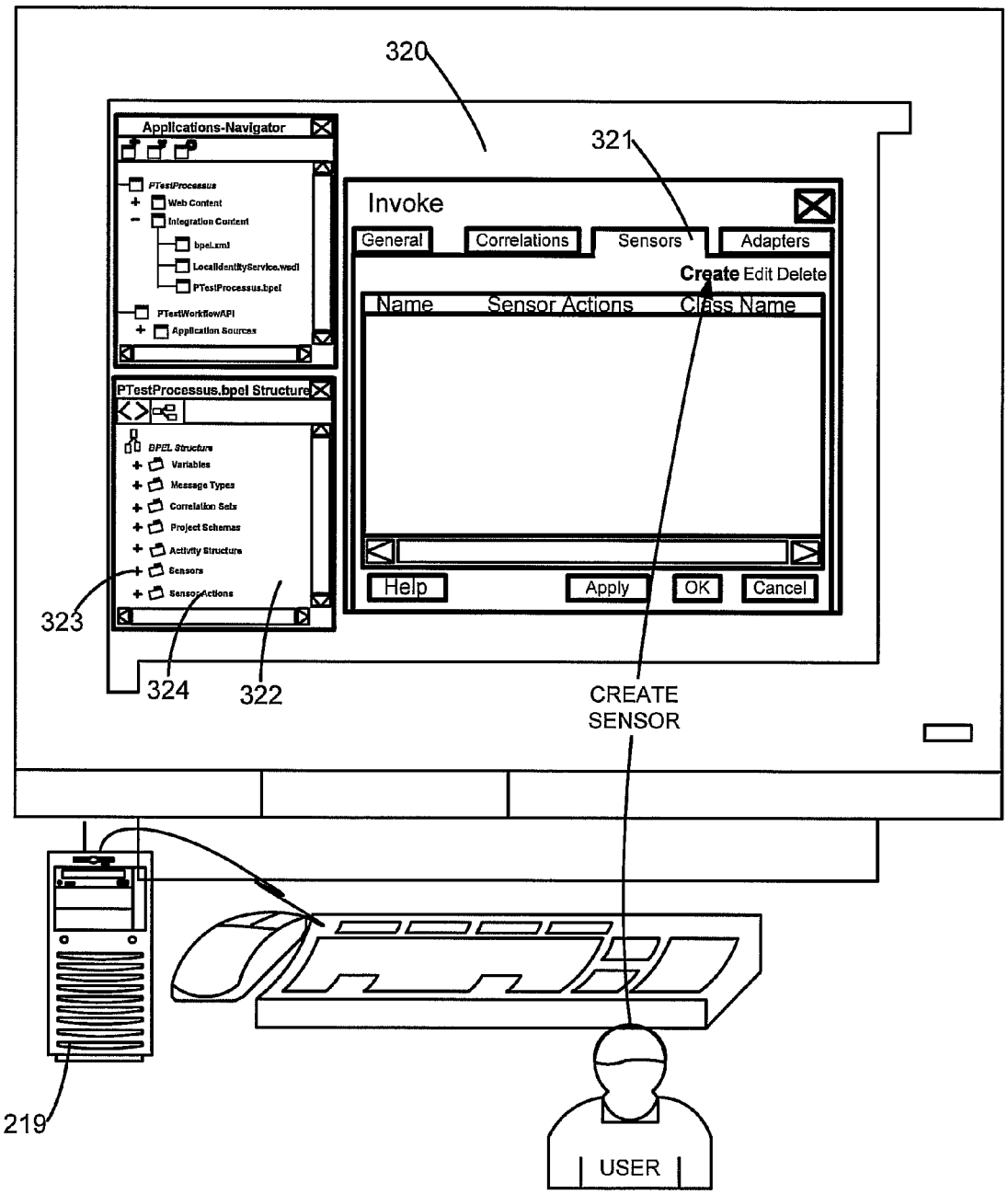

Some embodiments require additional detail from a user to create each sensor (e.g. sensor name and sensor action), and the additional information is received through an additional screen which may be displayed, e.g. as soon as the user double clicks a mouse button after placing the cursor on portion 313I (see 112 in FIG. 1A). Specifically, in such embodiments GUI 310 displays another screen 320 (called "property inspector") of the type illustrated in FIG. 3B. In this property inspector screen 320, the user creates a sensor by selecting the "sensors" tab 321, which results in display of a screen 301C shown in FIG. 3C for creating a sensor for an activity. Note that activity sensor screen 301C (FIG. 3C) is displayed in this sequence because property inspector screen 320 was invoked by selecting an activity (in this example the activity "Invoke") in GUI 310 (FIG. 3A). Alternatively, a user may directly go to process structure panel 322 (FIG. 3B), and right click on item 323 labeled "sensors" and on doing so, a drop-down list box showing three types of sensors namely activity, fault and variable is displayed. On selection of an "activity" sensor in this box, screen 301C (FIG. 3C) is displayed.

When screen 301C is first displayed to the user, field 312C is already filled in by the GUI computer, with the name of the activity which is to be monitored. In this embodiment, the user is required to type in a name for the sensor being created in field 311C (although as noted elsewhere, such a name may be automatically generated in some embodiments). Field 319C contains the default value "ALL" which means data capture is be performed whenever the activity changes state (e.g. on invocation of the activity, on completion of the activity, when the activity has an error and when the activity is re-tried). A user may select a specific state of an activity, if the sensor being created is for capturing data in only that specific state.

In screen 301C, user-selected data to be captured is identified in an array 350C which is initially empty. In some embodiments, the user clicks on a "Create" button to reach a screen (not shown) which lists all variables that are defined for the current activity. On the user selecting a variable in the list (or a portion of the variable's name) a row 351C is automatically filled by the GUI computer, using information 313C, 314C and 315C from the variable's definition in the schema for the business process.

Screen 301C contains a panel 390C for correlation of the sensor being created with a sensor action. Initially, no sensor actions are associated with the current sensor (although one or more sensor actions may have been defined by the user for other sensors). Hence, the user needs to click on the Add button to reach a screen (not shown) that displays a list of all previously defined sensor actions.

The user selects one or more sensor actions in this list (of sensor actions) to associate them with the sensor being created in which case the associated sensor actions are listed in the panel 390C. In FIG. 3C, the user has selected BAMFeed action 391C for association with the sensor. Note that the just-described list of sensor actions may be empty if no sensor actions were previously defined, and if so the user must click on a create button to reach a sensor action screen (e.g. screen in FIG. 4A).

After receipt of configuration information about a sensor, a description of one or more received values (e.g. see FIG. 3D) is generated by the GUI computer in an act 114 (FIG. 1A), e.g. in a predetermined language such as XML. During such generation, the GUI converts values from an internal format (in which the values are initially held on receipt from the user) into XML format in accordance with a schema of the type illustrated in FIG. 3E, and thereafter stores the result in a sensor file (e.g. named "sensor.xml") of the type shown in FIG. 3D. In the embodiment illustrated in FIG. 3D, not all received values are articulated in the sensor definition 215D, e.g. sensor action name "BAMFeed" in FIG. 3C is not present in FIG. 3D. As noted below, in this embodiment the association of a sensor with its sensor actions is actually articulated in the sensor action definition.

In other embodiments such an association between a sensor and its actions may be articulated in the sensor definition itself. Moreover, instead of XML any other language may be used describing the sensors, depending on the embodiment. After act 114, addition of sensor 312I is complete, and GUI 310 returns to displaying (as per act 111 in FIG. 1A), a modified version of the business process drawing now containing an icon for sensor 312I (see FIG. 3F) to inform the user that this sensor is currently in existence.

It is not necessary for a user to enter an association of a sensor with an action during sensor definition in screen 301C in FIG. 3C, because such association may be done at a later stage (e.g. the user may set up all sensors first, followed by setting up of sensor actions, followed by forming associations therebetween). When a user finishes identifying all sensors and/or sensor actions for a given business process 313 (e.g. by clicking a button), computer 219 transmits the one or more definitions 215 to computers 217-218 that execute the business process, and thereafter proceeds to perform the actions illustrated in FIG. 1C (described above).

In some embodiments, if a user has defined a sensor, a sensor action and also an association, then the icon that is displayed for sensor 312I is modified, e.g. the magnifying lens is shown in a different color or is shown shaded as compared to the icon displayed when only the sensor exists (without a sensor action associated thereto). Many embodiments do not make a distinction, in the drawing shown in FIG. 3A, between sensors with and without sensor actions defined, i.e. the same magnifying glass icon 312I is displayed if a sensor is configured for activity 313I regardless of any sensor actions associated with that sensor.

Sensors of the type described above in reference to FIGS. 3A-3J provide a much more fine-grained way for a user to 'show interest' in certain aspects of the business, e.g. by providing Activity sensors with embedded variable sensors, that is the sensor fires in the case where an activity reaches a certain state ('completed') and then the variable sensor contains the data of that activity, for example: "Give billing address of PO if shipping completed successfully"

The specific manner in which a destination's identification and type are received by GUI 310 can differ depending on the embodiment. In some embodiments, double clicking of the mouse on icon 312I causes the property inspector screen to be displayed by the GUI, which contains one or more fields for the user to enter identification of the destination (i.e. endpoint) as well as selection of an action to be performed to transfer captured data to the destination. Examples of such screens in one embodiment are illustrated in FIGS. 4A, 4G, 4I and 4K (described below).

An identified sensor, and a corresponding identified destination (with its type) are implicitly associated with one another in some embodiments by performance of acts 122 and 124 (FIG. 1B) in a single operation. As noted above, a destination's identity and type are two attributes of a sensor action that are used in some embodiments. In certain embodiments, a user may associate a sensor with one or more sensor actions explicitly in a screen for creating a sensor (e.g. FIG. 3C) by identifying therein name(s) for the sensor action(s), with the sensor action itself being created in another screen (e.g. in FIG. 4A).

Some embodiments of the GUI computer 219 describe each association between a sensor and a sensor action as a tuple of (sensor, endpoint, and endpoint type) in a sensor action definition (expressed in XML). Note that such a tuple may include one or more additional pieces of information, such as a filter to be applied to the captured data and/or other configuration information about the endpoint. If the business process is not executed in GUI computer 219, in which the sensor and sensor action are defined, then the description(s) generated by computer 219 is/are transferred to one or more computers 217-218 (FIG. 2A) for use therein during execution of the business process.

In some embodiments, it is possible for computer(s) 217-218 to receive a definition 214 (FIG. 3F) of the business process 313 as well as a definition 215 of sensors ahead of time and already be executing the business process prior to receipt of any sensor actions. Specifically, the one or more computer(s) 217-218 (FIG. 2A) execute a business process one activity at a time, while checking before/during/after execution of each activity as to whether or not capture of data is enabled. No data capture is performed in computers 217-218 that are executing a business process 313, until receipt of a sensor action definition of at least one tuple, after which time data capture becomes possible for the business process portions that have sensor(s).

If a sensor action is configured for a given sensor 312I in a definition 216, then data from business process portion 313I is captured (as per act 132 in FIG. 1C). The data that is captured (similar or identical to that shown in FIG. 4E) is predetermined, e.g. by a user who has marked the business process portion as having a sensor. The captured data is then transferred (as per act 133) to the endpoint associated with sensor 312I in sensor action definition 216 (FIG. 2A). Note that the transfer is performed directly without an intermediate step of storing in a database and the related latency. The transfer of captured data is effectuated by execution of a specific predetermined software (similar to that shown in FIG. 4M) that is uniquely associated with a type of the endpoint identified in the sensor action definition.

One example of predetermined software implements a first-in-first-out (FIFO) mechanism, and is used if the endpoint's type indicates the endpoint as being a queue. Another example of predetermined software implements a SQL query 228A (FIG. 2A) to store the data if the endpoint's type indicates the endpoint as being a database. Note that transfer of data to an end point may be disabled in a manner similar to that described above for enabling, e.g. by the user marking a tuple that was previously enabled as now being "disabled" in GUI 310, whereby GUI 310 notifies the one or more computers 217-218 of the same. Note also that the data actually transferred may be more than, less than or different from the captured data, e.g. if a header is added to the data, or if the data is filtered prior to transfer as described below.

A sensor in accordance with the invention can be created and/or enabled any number of times (e.g. by double clicking the business process portion 213I even when a sensor icon 212I is displayed adjacent thereto), which can make the sensor become associated with multiple endpoints. All endpoints associated with a given sensor are displayed in a list 329 in the property inspector (FIG. 3B). Hence, a given sensor of a given business process may be associated with any number of endpoints (and respective actions to be performed to transfer data to the endpoints). In such a case, the one or more computers 217-218 that execute the business process 213 are programmed in accordance with the invention to automatically transfer the sensor's data to the multiple endpoints. As noted above, specifying multiple endpoints for a single sensor causes the computers 217-218 to transfer the same data to each of the multiple endpoints which therefore receive this data in real time.

Note that GUI 310 is described above as being displayed by a business process modeler (BPM) software in computer 219.

If a BPM user enables a sensor 312I by identifying an endpoint B having type C, the GUI 310 transfers description of a first tuple (A, B, C) to computers 217-218 (in a sensor action definition). A GUI of another application such as a business activity monitor (BAM) software may also display the same sensor 312I (also overlaid on the drawing of business process 313) to its user. In this example, a BAM user may also enable sensor 312I (i.e. the same sensor 312I previously enabled by the BPM user). If the BAM user identifies a different endpoint D (and its type E) when enabling sensor 312I then, computers 217-218 may receive a second tuple (A, D, E). Therefore, in computers 217-218, the same sensor 312I becomes associated with two endpoints B and D (endpoint B was identified by the BPM user and endpoint D was identified by the BAM user).

In this example, two tuples are provided to computers 217-218 by the BAM and BPM softwares that operate independent of each other. Hence data captured by sensor 312I is transferred to both endpoints B and D by execution of predetermined softwares associated with the corresponding types C and E respectively. The predetermined softwares that are executed transfer the captured data in real time to the respective endpoints, thereby to eliminate latency that is otherwise created if such data were required to be persisted in a database prior to transfer to the identified endpoints.

Moreover, identification of multiple endpoints through the GUI and use of predetermined softwares eliminates the need for a user to manually program a callback function or a stored procedure to effectuate the transfer to each individual endpoint. Also, in such embodiments, disabling a transfer from a sensor (e.g. sensor A) to one of multiple endpoints (e.g. endpoint B) does not affect transfer of data captured from that sensor to one or more remaining endpoints (e.g. endpoint D) for which the sensor (e.g. sensor A) continues to remain enabled.

Note that definitions 214, 215 and 216 that are sent to computers 217-218 (which execute the business process) may be articulated by GUI computer 219 in languages that may be same as or different from each other, depending on the embodiment. For example, in some embodiments, definitions 214, 215 and 216 are all expressed in a common language, such as the extensible markup language (XML), while in other embodiments one or more definitions are expressed in languages different from one another. Even when expressed in the common language XML, one of the definitions, namely definition 214 is expressed in a predetermined grammar thereof, such as BPEL (described in the Background section above).

Also, in many embodiments, all three definitions 214, 215 and 216 are maintained in three corresponding documents. Maintaining definition 215 separate from definition 214 ensures that definition 214 remains unchanged, and therefore compatible with any tool in conformance with the language in which definition 214 is expressed (e.g. BPEL). Even if not articulated in the language BPEL, definition 214 may contain a number of similar activities, for example, an invoke activity to invoke a web service, a receive activity to wait for a message from an external source and a throw activity to raise an exception error.

Furthermore, definition 215 (FIG. 2A) may identify any portion of a business process 213 articulated in definition 214 regardless of whether that portion is logic or data or a combination thereof. In several embodiments, at least one sensor in definition 215 is identified as a portion of the business process that contains a variable whose data is transferred on being enabled, while another sensor contains a fault on whose occurrence the captured data is transferred. In one embodiment, the fault sensor simply identifies the fault occurrence. However, if a user has chosen a 'database' publish type, a SQL query is used to get the number of faults.

Maintaining definition 216 separate from definition 215 ensures that sensors defined in definition 215 can be enabled or disabled independent of their definition, e.g. enabled or disabled during run time. Furthermore, articulating definition 216 in the same language as definition 215 ensures that a common input mechanism (e.g. the same lexical analyzer) can be used by computers 217-218 for processing both definitions 215 and 216.

A fault sensor and a variable sensor can be created in a manner similar to that described above in reference to FIGS. 3C to 3F. Specifically, the user may select "fault" in a list of sensor types that is displayed on selection of the sensor item 323 in FIG. 3B, and on doing so screen 301G (FIG. 3G) is displayed to the user. The user then types in the name of a sensor being created in field 311G, and selects a namespace in field 343G, as well as a name of the fault in field 344G. Sensor actions are selected in panel 390G similar to that described above in reference to panel 390C.

Figures 3G, 3H:
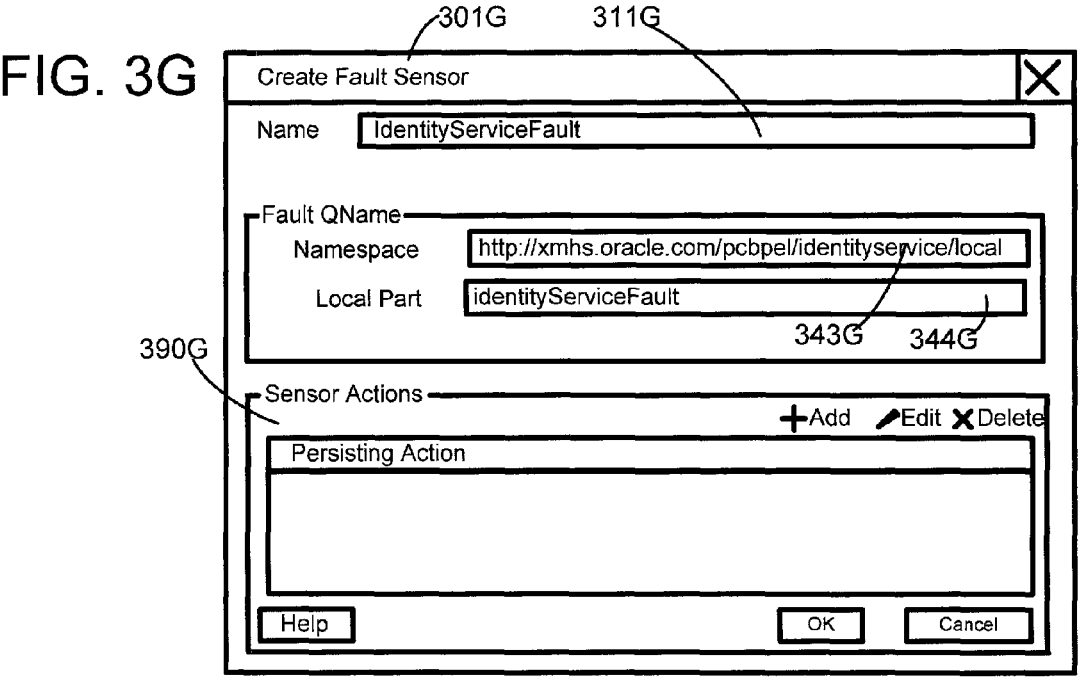
FIGS. 3G and 3I illustrate additional screens of the GUI in the exemplary embodiment, similar to the screen in FIG. 3C, for receipt from the user of configuration information regarding two different kinds of sensors.
FIGS. 3H and 3J illustrate additional definitions of sensors, similar to the sensor definitions of FIG. 3D, holding the values of sensors received in the additional screens of FIGS. 3G and 3I respectively.
Figures 3I, 3J:
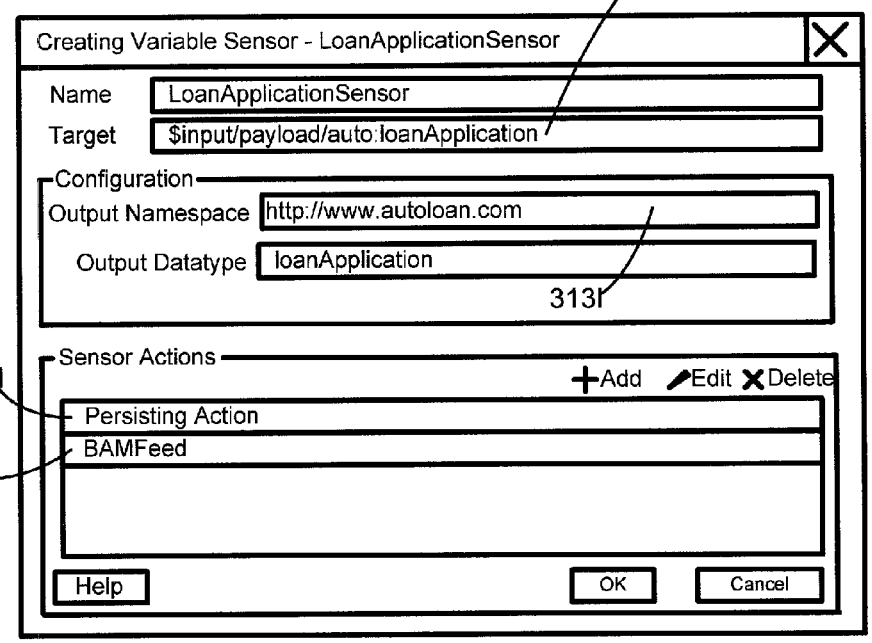

The definition of a fault sensor which is generated by the GUI computer is illustrated in FIG. 3H. This definition is also generated in conformance with the schema for sensor definitions illustrated in FIG. 3E. Note that in FIG. 3H, "is" labeled 343H is mapped to a name space that corresponds to the fault named in field 344G. Moreover, the user may define a variable sensor in a manner similar to definition of the fault sensor, as illustrated in FIGS. 3I and 3J. The variable sensor monitors for any changes in a variable (or a portion thereof) in the target identified in field 312I. Note that in the illustration shown in FIG. 3I, two sensor actions 391I and 392I are invoked whenever there is a change in this variable.

In some embodiments of the invention, a screen 401A (FIG. 4A) is displayed in response to the user double clicking on a sensor action item 324 in panel 322 (FIG. 3B). Note, however, that this screen 401A may alternatively be reached through one of the sensor creation screens illustrated in FIGS. 3C, 3G and 3I by clicking the "Add" button therein. In the example screen 401A shown in FIG. 4A, the sensor action is named "BAMFeed". Screen 401A contains a number of fields, such as a field 411A labeled "Name" in which the user may supply a name to be used in referring to this tuple (also called "sensor action").

Screen 401A also contains a field 412A labeled "Publish Type" in which the user selects a type for the endpoint, e.g. from an enumerated set shown in a drop-down list box that is displayed by clicking in field 412A. In the example shown in FIG. 4A, there are three choices for the value in field 412A namely "JMS Queue", "Database," and "Custom", and the user has selected the endpoint type to be "JMS Queue". Note that although in some embodiments only three choices are displayed in field 412A for selection by a user, other embodiments may display fewer or more choices. For example, FIG. 4D shows (in the list 420 in portion FIG. 4D1) that four choices are displayed to the user in one specific embodiment.

The embodiment illustrated in FIG. 4A permits a user to supply their own software for interfacing to an endpoint by identifying the endpoint's type as being "custom" in field 412A as shown in screen 401A illustrated in FIG. 4A. In the example shown in FIG. 4A, the user has identified in field 414A an endpoint of name "loanflow.LoanFlowTicker" to be accessed by custom software. On clicking the "OK" button on screen 401A, the user is prompted to supply additional information in a screen 420 (FIG. 4B) which elicits from the user, the configuration information about the custom software in greater detail.

For example, in field 421 of screen 420 (FIG. 4B) the user identifies a name of the new class of the custom software to be LoanFlowTicker. Moreover in field 422 of screen 420 the user identifies a package in which the new class is contained to be "loanflow". Note that screen 420 contains another field 423 in which the user supplies the identity of another package which is being extended, e.g. Java.lang.Object. By identifying and providing custom software 226C (FIG. 2A) which has the name "loanflow.LoanFlowTicker", the user can programmatically do whatever they want with the data captured by sensor 212I. In an example of the type of arbitrary action permitted, custom software 226C of FIG. 2A prepares an email message based on certain values in the captured data (FIG. 4E), and transfers the email message to an email server 228Z for onward transmission to an email address (e.g. the user's email address).

Therefore, in screen 420 (FIG. 4B) the user provides configuration information identifying e.g. the custom software's name, and location, such as Java class which conforms to a publicly-documented Java API or other such software identity as will be apparent to the skilled artisan. An example of such custom software is provided in FIG. 4M. Instead of providing custom software, in other embodiments, the user may simply select one of predetermined softwares 226A and 226B in screen 401A by selecting an appropriate one of several predetermined values (such as "database" or "JMS Queue") that are selectable in field 412A of FIG. 4A.

A user's selection of one such predetermined software eliminates the need for the user to write custom software. Instead by simply pointing and clicking the user is able to create or modify the type of destination(s) to which captured data is to be transferred. Specifically, a non-custom publish type selected by a user in field 412A requires an actual endpoint, such as a queue or a database to be identified in the publish target field 414A (discussed in next paragraph). Such an endpoint may be located in a computer 299 (shown at the bottom of FIG. 2A) that may contain a business activity monitor (BAM) software. Computer 299 of some embodiments is different from computers 217-218 in which the business process is being executed, although in other embodiments a single computer may be used.

Screen 401A also contains a field 414A labeled "Publish Target" in which the user identifies the endpoint. In the example shown in FIG. 4A, the user has identified the endpoint to be "jms/bamTopic", which is a name that can be resolved by JNDI to identify the underlying physical Queue or Topic. JNDI is a J2EE standard used to resolve names to their underlying physical entities (queues, topics, databases etc.) In this embodiment, the user may use any XPATH expression to identify the endpoint in field 414A. Note that an endpoint identified by a user in publish target field 414A (FIG. 4A) is interfaced by predetermined software that executes within computers 217-218 in which the business process is being executed although in alternative embodiments such an endpoint (to which the data is transferred) may be hardcoded in the software (which may be predetermined or custom as discussed above).

In several embodiments, a field 415A labeled "Filter" is optionally received from the user, and in this example in FIG. 4A the user has left it blank (such a filter is discussed elsewhere herein). The field 416A indicating enablement of the sensor action has the value "checked" by default when screen 401A is first displayed to the user, and this field becomes "unchecked" when clicked on by the user, as may be done when data transfer from a previously enabled sensor is to be discontinued.

On clicking the "OK" button on screen 401A (FIG. 4A) the GUI articulates a sensor action definition 216 (e.g. in XML) as shown in FIG. 4C, for instructing computers 217-218 to supply the captured data to custom software 226C (FIG. 2A), based on the information supplied by the user. Specifically, the information entered by the user in fields 411A, 412A, 414A and 415A of screen 401A (FIG. 4A) is stored temporarily in variables in a memory of the GUI computer, when generating a definition 216 (FIG. 4C) of the sensor action, after the user finishes entering the information in screen 401A. Sensor action definition 216 contains not only a tag "action" which describes the sensor action itself, but also one or more "sensorName" tags with which the sensor action is associated as shown in FIG. 4C. As noted elsewhere, a sensor action may be associated in a screen for creating or editing a sensor as shown in FIGS. 3C, 3G and 3I.

Figures 4G, 4H:
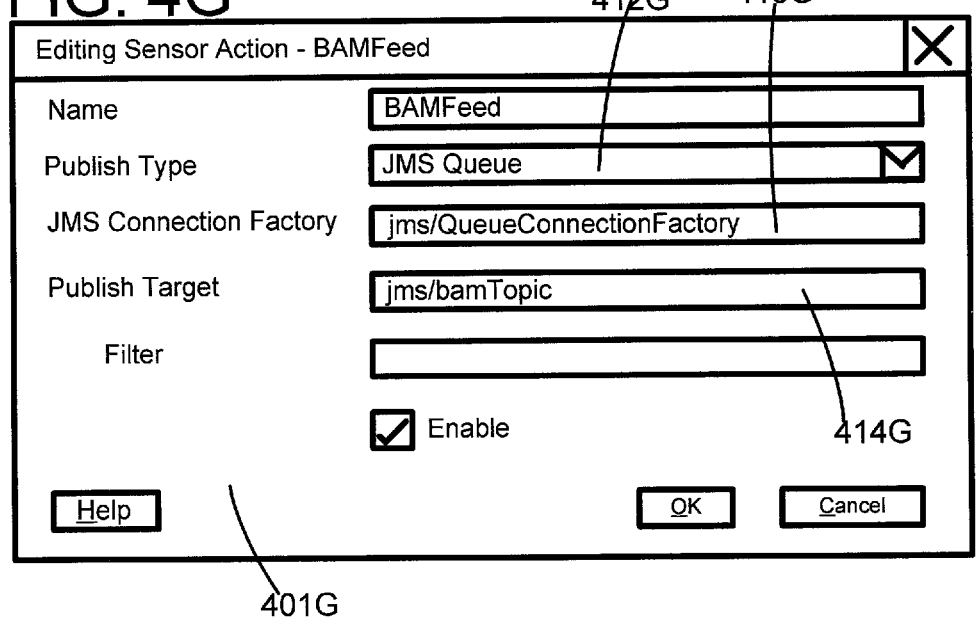

Sensor action definition 216 (FIG. 4C) may be articulated by the GUI computer, in conformance with an XML Schema Definition of the type shown in FIG. 4D. Reference numerals in several of FIGS. 4A-4L for corresponding items (such as definitions and descriptions) are obtained by replacing letter suffixes in the reference numerals, wherein the letter suffixes correspond to respective figure numbers. For example, definition 412D in FIG. 4D defines the endpoint's type field 412A in FIG. 4A. Definition 421 of FIG. 4D is optional and not shown in FIG. 4A. After articulation of definition 216 (FIG. 4C), the GUI computer returns to displaying the business process overlaid with sensors (similar to that illustrated in FIG. 2A), which in some embodiments, shows a modified version of sensor 312I to indicate that this sensor is enabled.

At this stage, as noted elsewhere, a user may again double click on the same portion 313I, to associate multiple endpoints with sensor 312I. In response to configuring multiple sensor actions, multiple definitions 216 are produced in some embodiments, one for each sensor action. Also a user may double click on a different portion 313N for example, to enable data capture therefrom. The user may associate a common sensor action with multiple sensors in the respective screens (e.g. see FIGS. 3C and 3I), in which case a common sensor action definition 216 (FIG. 4C) is generated to contain multiple sensor names, such as 417C and 498 (FIG. 4C). A sensor which has multiple actions may be illustrated in some embodiments of FIG. 3A by displaying a modified version of the sensor icon, such as a double magnifying lens to indicate the presence of multiple actions, although in other embodiments no distinction is made between sensors with one or more actions.

The GUI computer, of some embodiments is implemented by the software JDeveloper BPEL Designer to maintain a single sensor action file (called sensorAction.xml) that contains all sensor action definitions. The sensor action file is identified in a deployment descriptor of the BPEL process. The sensor action file in the GUI computer is automatically kept in synchronization with the sensors and actions that the user models in BPEL designer in the GUI computer. Such a sensor action file (FIG. 4C) is eventually (e.g. in response to a user indicating completion of sensor and/or sensor action configuration) transmitted to the one or more business process computers 217, 218 for storage in the sensor registry 223 (FIG. 2A) in a non-volatile memory therein.

In one illustrative embodiment, business process manager 222 receives such files from the GUI computer and stores them in the sensor registry 223, although in other embodiments sensor registry 223 interfaces directly with the GUI computer for receipt and storage of such configuration files 215 and 216. Note that files 215 and 216 contain pure metadata in many embodiments, which respectively (a) trigger data collection by the sensor framework in response to events identified by the business process manager 222, and (b) identify the endpoints to which the data is transferred by the sensor framework, e.g. by use of standard J2EE JMS APIs (to enqueue the sensor data in the JMS Queue). As files 215 and 216 (FIG. 2A) contain merely metadata, there is no requirement to use business process manager 222 to simply store such files in the sensor registry 223.

As is well known to the skilled artisan, JMS is a commonly available set of APIs and frameworks that support reliable, scalable, portable, and asynchronous messaging among J2EE applications. JMS supports two basic styles of message-based endpoints, namely a queue and a topic. Multiple receivers can listen for messages in a queue, but the arrived message can be retrieved by only one receiver. Once the message is retrieved, it is deleted from the queue and is no longer available to other receivers. A topic endpoint lets multiple subscribers listen for messages that are published to the topic. Unlike a queue, a message published to a topic does not get deleted once it is retrieved. The message stays on the topic and is available for all subscribers. In the example illustrated in FIG. 2A, a common predetermined software 226A is used to transfer data to both styles of endpoints (queue and topic), because both have a message interface (although after receipt each handles the message differently).

Referring to FIG. 4G, screen 401G contains a publish type field 412G wherein the user has selected the value JMS Queue, and another field 413G labeled "JMS Connection Factory" in which the user supplies a property of the endpoint to be used in finding the endpoint. The user may type into field 413G the identity of an object that contains the configuration parameters in conformance with the Java Messaging System (JMS) Application Programming Interface (API) which is to be used to access the endpoint. The configuration parameters in such an object may identify, for example, a namespace in which the endpoint is to be found, wherein the namespace conforms to Java Naming and Directory Interface (JNDI). In the example shown in FIG. 4G, the user has identified the object to be "jms/QueueConnectionFactory" in the field 413G, and the GUI computer generates a property name tag 413H (FIG. 4H) in conformance with the sensor action type's property description 418 (FIG. 4D).

In an example screen 401I illustrated in FIG. 4I, the user has named in field 411I the sensor action to have the value "BigMoneyBAMAction" and selected in publish type field 412I the value to be "JMS Queue" (which is same as in screen 401G in FIG. 4G). The user has also set, in field 413I (in screen 401I in FIG. 4I) a value of property JMS Connection Factory to be "jms/QueueConnectionFactory" (also same as in screen 401G). In screen 401I however, the user identifies a different endpoint in field 414I to be "jms/bigMoneyQueue", than the endpoint identified in field 414G. In the example illustrated in FIG. 4I, the user also specifies a filter in field 415I, to pass data only when the loan amount is larger than $100,000.

When definitions 216 of the two respective endpoints "jms/bigMoneyQueue" and "jms/bamTopic" are both transferred (e.g. in a single sensor action document) to computers 217 and 218, a sensor registry in these computers is updated to identify the two endpoints "jms/bigMoneyQueue" and "jms/bamTopic" as the destinations of any data captured from sensor 312I. Note that while endpoint "jms/bamTopic" receives all the data captured by sensor 312I, the other endpoint jms/bigMoneyQueue receives only that data which has been filtered by the user-specified filter (in field 415I of screen 401I in FIG. 4I), i.e. when the Boolean condition is satisfied. Referring to FIG. 2A, data captured from sensor 312I is transferred without any filtering in act 273 by an initial performance of act 274 for the endpoint jms/bamTopic, followed by the "Y" branch out of act 275 to return to act 272, followed by filtering in act 273 and transfer of the filtered data in a repeated performance of act 274 for the endpoint jms/bigMoneyQueue. Note that transfer of captured data in a predetermined format (as shown in FIG. 4E, in accordance with a schema shown in FIG. 4F) to each of the two endpoints "jms/bigMoneyQueue" and "jms/bamTopic" is performed as soon as the data is captured, without an intermediate step of storing the data in a database.

Figures 4K, 4L:
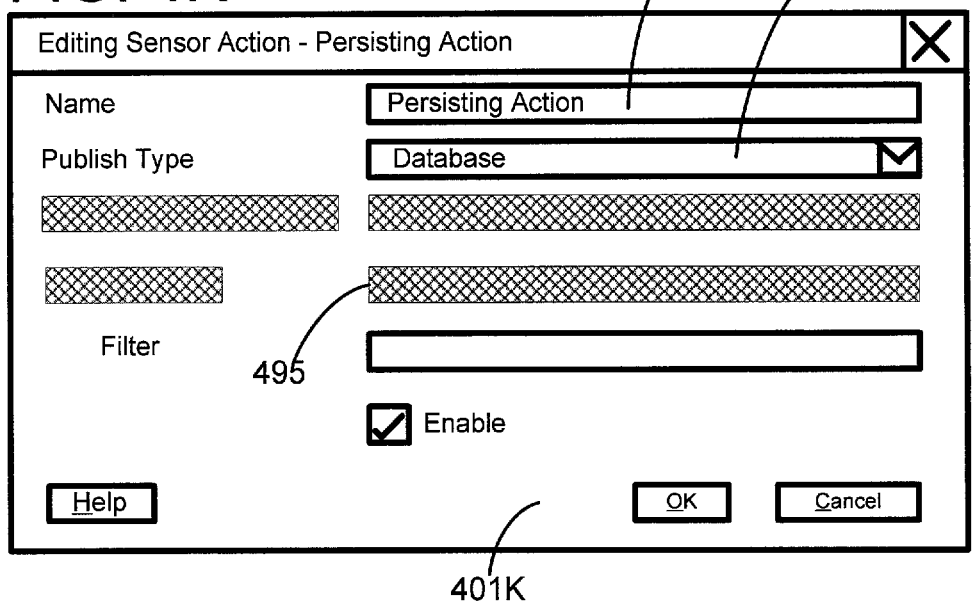

Although the captured data is not stored in a database prior to transmission to an endpoint, it is possible for the user to select an endpoint to be a database itself, in which case the captured data is stored in the database (instead of or in addition to transfer to any other endpoints specified by the user). Selection of a database is illustrated in a screen 401K in FIG. 4K wherein the user has named this action to be "Persisting Action" in field 411K. In this particular embodiment, the user merely selects the endpoint type in field 412K to be the database type, and there is no need for the user to supply any further information. On the user clicking the "OK" button, the graphical user interface (GUI) articulates a definition 216 (i.e. sensor action) e.g. in XML as shown in FIG. 4L.

On screen 401K (FIG. 4K) if desired, the user may optionally supply a Boolean condition to be applied to captured data in field 413K before the data is persisted into the database. Note that there is no field named "Publish Target" in screen 401K in FIG. 4K because selection of a "database" type as the endpoint type, in this embodiment, results in automatic identification of a default database which has a default location. In the illustrative embodiment shown in FIG. 4K, there are place-holders for such fields, e.g. place-holder 495 which is shown hatched. Other embodiments may enable the user to supply an XPATH expression to identify a specific database (which may be one of several databases as illustrated in FIG. 2A), by receiving the database's identity in a field named "Publish Target" which is added to screen 401K in these other embodiments.

In some embodiments, two properties are added to a file (FIG. 5B) which is used to deploy the business process, to identify the files 511, 512 and 513 that contain the respective names of the business process file (named "bpel.xml"), the sensor file (named "sensor.xml") and the sensor action file (named "sensorAction.xml"). By using separate files in these embodiments, for the sensor and sensor actions definitions, the business process file is kept unchanged, thereby to implement an overlay of the sensors and sensor actions on the business process (instead of modifying the business process itself).

Computers 219, 218 and 217 of the type illustrated in FIG. 2A may contain one or more hardware and software components of the type discussed next. Specifically, a computer system 600 includes a bus 602 (FIG. 6A) or other communication mechanism for communicating information, and a processor 605 coupled with bus 602 for processing information. Computer system 600 also includes a main memory 606, such as a random access memory (RAM) or other dynamic storage device, coupled to bus 602 for storing information and instructions to be executed by processor 605.

Main memory 606 also may be used for storing temporary variables or other intermediate information during execution of instructions to be executed by processor 605. Computer system 600 further includes a read only memory (ROM) 608 or other static storage device coupled to bus 602 for storing static information and instructions for processor 605. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 605. Another type of user input device is cursor control 616, such as a mouse, a trackball, or cursor direction keys for communicating direction information and command selections to processor 605 and for controlling cursor movement on display 612. This input device typically has two degrees of freedom in two axes, a first axis (e.g., x) and a second axis (e.g., y), that allows the device to specify positions in a plane.

As described elsewhere herein, transportation planning is performed by computer system 600 in response to processor 605 executing one or more sequences of one or more instructions contained in main memory 606. Such instructions may be read into main memory 606 from another computer-readable medium, such as storage device 610. Execution of the sequences of instructions contained in main memory 606 causes processor 605 to perform one or more acts described herein and illustrated in FIGS. 1A-1C. In alternative embodiments, hard-wired circuitry may be used in place of or in combination with software instructions to implement the invention. Thus, embodiments of the invention are not limited to any specific combination of hardware circuitry and software.

The term "non-transitory computer-readable medium" as used herein refers to any memory that participates in providing instructions to processor 605 for execution. Such a memory may take many forms, including but not limited to, non-volatile memory and volatile memory. Non-volatile memory includes, for example, optical or magnetic disks, such as storage device 610. volatile memory includes dynamic memory, such as main memory 606.

Common forms of non-transitory computer-readable media include, for example, a floppy disk, a flexible disk, hard disk, magnetic tape, or any other magnetic memory, a CD-ROM, any other optical memory, punch cards, paper tape, any other physical medium with patterns of holes, a RAM, a PROM, and EPROM, a FLASH-EPROM, any other memory chip or cartridge.

Various forms of computer readable media may be involved in carrying one or more sequences of one or more instructions to processor 605 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 605 retrieves and executes the instructions. The instructions received by main memory 606 may optionally be stored on storage device 610 either before or after execution by processor 605.

Computer system 600 also includes a communication interface 615 coupled to bus 602. Communication interface 615 provides a two-way data communication coupling to a network link 620 that is connected to a local network 622. Local network 622 may interconnect multiple computers (as described above). For example, communication interface 618 may be an integrated services digital network (ISDN) card or a modem to provide a data communication connection to a corresponding type of telephone line. As another example, communication interface 615 may be a local area network (LAN) card to provide a data communication connection to a compatible LAN. Wireless links may also be implemented. In any such implementation, communication interface 615 sends and receives electrical, electromagnetic or optical signals that carry digital data streams representing various types of information.

Network link 620 typically provides data communication through one or more networks to other data devices. For example, network link 620 may provide a connection through local network 622 to a host computer 625 or to data equipment operated by an Internet Service Provider (ISP) 626. ISP 626 in turn provides data communication services through the world wide packet data communication network 624 now commonly referred to as the "Internet". Local network 622 and network 624 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 660 might transmit a mission (which is part of a transportation plan) through Internet 628, ISP 626, local network 622 and communication interface 615.

The instructions for performing acts 111-116 and 121-124 in FIGS. 1A and 1B or alternatively acts 131-133 in FIG. 1C may be executed by processor 605 as they are received, and/or stored in storage device 610, or other non-volatile storage for later execution. In this manner, computer system 600 may obtain the just-described instructions and any related data in the form of a carrier wave and/or an optical disk.

Figure 6A:
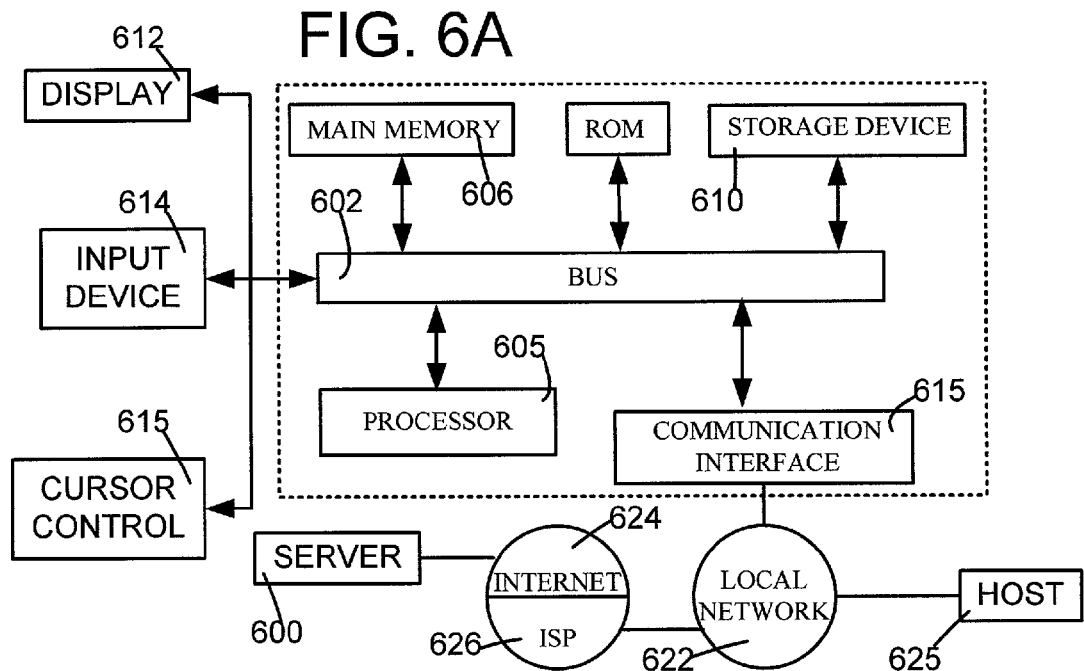
FIGS. 6A and 6B illustrate, in block diagrams, hardware and software portions of a computer that performs one or more acts of the method illustrated in FIGS. 1A-1C.
Figure 6B:
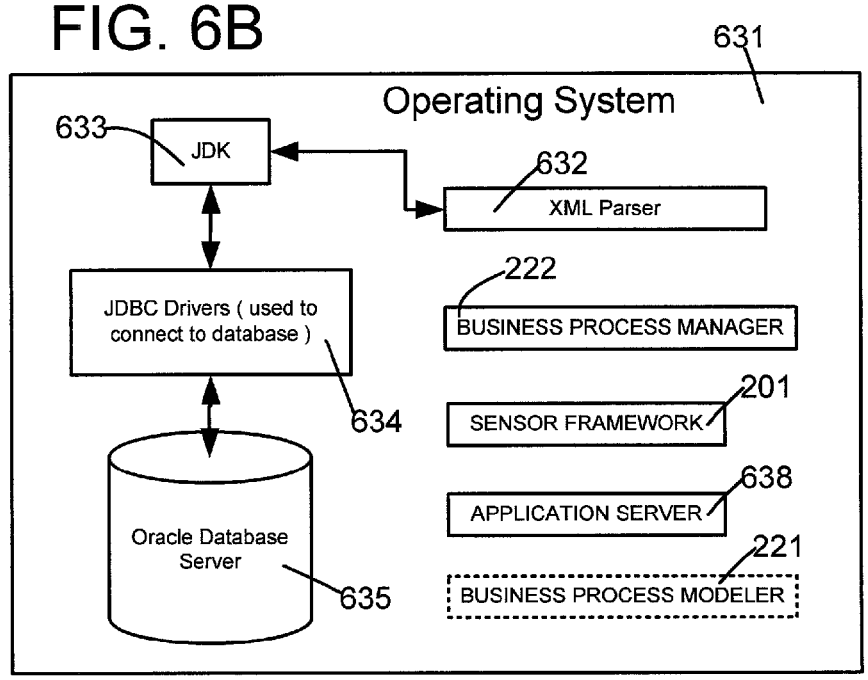

Note that FIG. 6A is a very low-level representation of many hardware components of a computer system. Several embodiments have one or more additional software components in main memory 606 as shown in FIG. 6B: Operating System 631 (e.g. Microsoft WINDOWS 2000), Database Server 635 (e.g. Oracle Server v9i2 for the source computer; e.g. Oracle Server v8i for the target computer), Java Development Kit 633 (e.g. JDK v68), Java XMLParser 632 (e.g. xmlparser available from Oracle Corporation), JDBC drivers 634 (e.g. JDBC driver available from Oracle Corporation). A computer system for computers 217 and/or 218 may also include additional softwares such as business process manager 222, sensor framework 201, application server 638 (whereas a computer system for the GUI computer 219 may include business process modeler 221).

In some embodiments of the invention, the sensor data is persisted in a database using a predefined relational schema. The following public views can be used from a client GUI (such as Oracle Warehouse Builder, portal, etc.) to query the sensor values using SQL. A view called BPMPROCESSES gives an overview of all the deployed business processes across the domains of a Business Process Manager (BPEL PM).

| Name | Type | Size | I? | N? | Comment |
| --- | --- | --- | --- | --- | --- |
| NAME | NVARCHAR2 | 100 | U1, 1 | N | Name of the BPEL process |
| REVISION | VARCHAR2 | 50 | U1, 2 | N | Revision of the BPEL process |
| DOMAIN_ID | VARCHAR2 | 50 | U1, 3 | N | BPEL PM domain name |
| BASE_URL | NVARCHAR2 | 256 | | N | The base URL of the BPEL suite |
| SENSOR_URL | NVARCHAR2 | 256 | | N | The URL of the sensor file |
| SENSOR_ACTION_URL | NVARCHAR2 | 256 | | N | The URL of the sensor action file |

A view, called BPMPROCESSANALYSIS REPORT gives an overview of all the process instances of the BPEL PM. Another view called BPMPROCESSINSTANCES is a subset of view BPMPROCESSANALYSISREPORT and contains only those process instances where sensors are defined for the corresponding BPEL process and the sensor action performed at least once. Both these views have the following schema.

| Name | Type | Size | I? | N? | Comment |
| --- | --- | --- | --- | --- | --- |
| ID | NUMBER | | PK | N | Unique (cube) instance Id |
| BPEL_PROCESS_NAME | NVARCHAR2 | 100 | | N | Name of the BPEL process |
| BPEL_PROCESS_REVISION | VARCHAR2 | 50 | | N | Revision of the BPEL process |
| DOMAIN_ID | VARCHAR2 | 50 | | N | BPEL PM domain name |
| TITLE | VARCHAR2 | 50 | | Y | User defined title of the BPEL process |
| STATE | NUMBER | | | Y | State of the BPEL process instance |
| STATE_TEXT | VARCHAR2 | | | Y | Text presentation of the state attribue |

| Name | Type | Size | I? | N? | Comment |
|---|---|---|---|---|---|
| PRIORITY | NUMBER | | | Y | User defined priority of the BPEL process instance |
| STATUS | VARCHAR2 | 100 | | Y | User defined status of the BPEL process |
| STAGE | VARCHAR2 | 100 | | Y | User defined stage property of a BPEL process |
| CONVERSATION_ID | VARCHAR2 | 100 | | Y | User defined conversation id of a BPEL process |
| CREATION_DATE | TIMESTAMP | | | N | The creation timestamp of the process instance |
| MODIFY_DATE | TIMESTAMP | | | Y | Timestamp when the process instance was modified |
| TS_DATE | DATE | | | Y | Date portion of modify_date |
| TS_HOUR | NUMBER | | | Y | Hour portion of modify_date |
| EVAL_TIME | NUMBER | | | Y | Evaluation time of the process instance in msecs |
| SLA_COMPLETION_TIME | NUMBER | | | Y | SLA completion time in msecs |
| SLA_SATISFIED | VARCHAR2 | 1 | | Y | 'Y' or 'N' |

Still another called BPMACTIVITYSENSORVALUES contains all the activity sensor values of the monitored BPEL processes:

| Name | Type | Size | I? | N? | Comment |
|---|---|---|---|---|---|
| ID | NUMBER | | PK | N | Unique Id |
| PROCESS_INSTANCE | NUMBER | | | N | ID of process instance |
| BPEL_PROCESS_NAME | NVARCHAR2 | 100 | U1, 1 | N | Name of the BPEL process |
| BPEL_PROCESS_REVISION | VARCHAR2 | 50 | U1, 2 | N | Revision of the BPEL process |
| DOMAIN_ID | VARCHAR2 | 50 | U1, 3 | N | BPEL PM domain name |
| SENSOR_NAME | NVARCHAR2 | 100 | | N | The name of the sensor that fired |
| SENSOR_TARGET | NVARCHAR2 | 256 | | N | The target of the fired sensor |
| ACTION_NAME | NVARCHAR2 | 100 | | N | The name of the sensor action |
| ACTION_FILTER | NVARCHAR2 | 256 | | Y | The filter of the action |
| CREATION_DATE | TIMESTAMP | | | N | The creation date of the activity sensor value |
| MODIFY_DATE | TIMESTAMP | | | Y | The timestamp of last modification |
| TS_DATE | DATE | | | Y | The Date part of modify_date |
| TS_HOUR | NUMBER | | | Y | The hour part of modify_date |
| ACTIVITY_NAME | NVARCHAR2 | 100 | | N | The name of the BPEL activity |
| ACTIVITY_TYPE | VARCHAR2 | 30 | | N | The type of the BPEL activity |
| ACTIVITY_STATE | VARCHAR2 | 30 | | Y | The state of the activity |
| EVAL_POINT | VARCHAR2 | 20 | | N | The eval point of the activity sensor |
| ERROR_MESSAGE | NVARCHAR2 | 2000 | | Y | An error message |
| RETRY_COUNT | NUMBER | | | Y | The number of retries of the activity |
| EVAL_TIME | NUMBER | | | Y | Evaluation time of the activity in msecs |

Still another view called BPMFAULTSENSOR

| Name | Type | Size | I? | N? | Comment |
|---|---|---|---|---|---|
| ID | NUMBER | | PK | N | Unique Id |
| PROCESS_INSTANCE | NUMBER | | | N | ID of process instance |
| BPEL_PROCESS_NAME | NVARCHAR2 | 100 | U1, 1 | N | Name of the BPEL process |
| BPEL_PROCESS_REVISION | VARCHAR2 | 50 | U1, 2 | N | Revision of the BPEL process |
| DOMAIN_ID | VARCHAR2 | 50 | U1, 3 | N | BPEL PM domain name |
| SENSOR_NAME | NVARCHAR2 | 100 | | N | The name of the sensor that fired |
| SENSOR_TARGET | NVARCHAR2 | 256 | | N | The target of the fired sensor |
| ACTION_NAME | NVARCHAR2 | 100 | | N | The name of the sensor action |
| ACTION_FILTER | NVARCHAR2 | 256 | | Y | The filter of the action |
| CREATION_DATE | TIMESTAMP | | | N | The creation date of the activity sensor value |
| MODIFY_DATE | TIMESTAMP | | | Y | The timestamp of last modification |
| TS_DATE | DATE | | | Y | The Date part of modify_date |
| TS_HOUR | NUMBER | | | Y | The hour part of modify_date |
| ACTIVITY_NAME | NVARCHAR2 | 100 | | N | The name of the BPEL activity |
| ACTIVITY_TYPE | VARCHAR2 | 30 | | N | The type of the BPEL activity |
| MESSAGE | CLOB | | | Y | The fault message |

VALUES contains all fault sensor values, as shown below.

Still another view called BPMVARIABLESENSOR VALUES contains all the variable sensor values, as shown below.

| Name | Type | Size | I? | N? | Comment |
|---|---|---|---|---|---|
| ID | NUMBER | | PK | N | Unique Id |
| PROCESS_INSTANCE | NUMBER | | | N | ID of process instance |
| BPEL_PROCESS_NAME | NVARCHAR2 | 100 | U1, 1 | N | Name of the BPEL process |
| BPEL_PROCESS_REVISION | VARCHAR2 | 50 | U1, 2 | N | Revision of the BPEL process |
| DOMAIN_ID | VARCHAR2 | 50 | U1, 3 | N | BPEL PM domain name |
| SENSOR_NAME | NVARCHAR2 | 100 | | N | Name of sensor that fired |
| SENSOR_TARGET | NVARCHAR2 | 256 | | N | Target of the sensor |
| ACTION_NAME | NVARCHAR2 | 100 | | N | Name of the action |
| ACTION_FILTER | NVARCHAR2 | 256 | | Y | Filter of the action |
| ACTIVITY_SENSOR | NUMBER | | | Y | Id of corresponding activity sensor value |
| CREATION_DATE | TIMESTAMP | | | N | Creation date |
| TS_DATE | DATE | | | N | The Date part of creation_date |
| TS_HOUR | NUMBER | | | N | The hour part of creation_date |
| VARIABLE_NAME | NVARCHAR2 | 256 | | N | The name of the BPEL variable |
| CRITERIA_SATISFIED | VARCHAR2 | 1 | | Y | 'Y' or 'N' |
| TARGET | NVARCHAR2 | 256 | | | |
| UPDATER_NAME | NVARCHAR2 | 100 | | N | The name of the activity or event that updated the variable |
| UPDATER_TYPE | NVARCHAR2 | 100 | | N | The type of BPEL activity or event |
| VALUE_TYPE | SMALLINT | | | N | The value type of the variable (coresponds to java.sql.Types values) |

-continued

| Name | Type | Size | I? | N? | Comment |
|---|---|---|---|---|---|
| VARCHAR2_VALUE | NVARCHAR2 | 2000 | | Y | The value of 'String' like variabales |
| NUMBER_VALUE | NUMBER | | | Y | The value of number like variables (float, double, int, etc.) |
| DATE_VALUE | TIMESTAMP | | | Y | The value of date like variables |
| BLOB_VALUE | BLOB | | | Y | The value of binary data variables |
| CLOB_VALUE | CLOB | | | Y | The value of clob like variables (XML) |

Still another view called BMPERRORS contains all the errors from BPM services, as shown below.

| Name | Type | Size | I? | N? | Comment |
|---|---|---|---|---|---|
| ID | NUMBER | | PK | N | Unique Id |
| BPEL_PROCESS_NAME | NVARCHAR2 | 100 | U1, 1 | N | Name of the BPEL process |
| BPEL_PROCESS_REVISION | VARCHAR2 | 50 | U1, 2 | N | Revision of the BPEL process |
| DOMAIN_ID | VARCHAR2 | 50 | U1, 3 | N | BPEL PM domain name |
| CREATION_DATE | TIMESTAMP | | | N | The creation date of the activity sensor value |
| TS_DATE | DATE | | | N | The Date part of creation_date |
| TS_HOUR | NUMBER | | | N | The hour part of creation_date |
| ERROR_CODE | NUMBER | | | N | Error code |
| EXCEPTION_TYPE | NUMBER | | | N | Type of the error |
| EXCEPTION_SEVERITY | NUMBER | | | N | Severity of the error |
| EXCEPTION_NAME | NVARCHAR2 | 200 | | N | Name of the error |
| EXCEPTION_DESCRIPTION | NVARCHAR2 | 2000 | | Y | A short description of the error |
| EXCEPTION_FIX | NVARCHAR2 | 2000 | | Y | A description on how to fix the error |
| EXCEPTION_CONTEXT | VARCHAR2 | 4000 | | Y | The context of the error |
| COMPONENT | NUMBER | | | N | The BPM component that caused the error |
| THREAD_ID | VARCHAR2 | 200 | | N | The Java thread name where the error occurred |
| STACKTRACE | CLOB | | | N | The Java stack trace |

Numerous modifications and adaptations of the embodiments described herein will become apparent to the skilled artisan in view of this disclosure. Note that although some embodiments use a single screen (e.g. see FIG. 3C) to receive a tuple including a sensor's identity and also an identity of its sensor action, other embodiments may receive such a tuple differently. Specifically, in an alternative embodiment, sensors are displayed in a left column and endpoints are displayed in a right column and the user selects a sensor in the left column and one or more endpoints in the right column, and after being satisfied as to the selections in the two columns, clicks on a button to form an association therebetween, and the computer responds by articulating a tuple in the manner described above. Moreover, sensors and sensor actions of the type described above can be reviewed, changed and deleted, as well as new ones added by a graphical user interface (GUI) in the same computer 219 or in a computer which is completely different from computer 219 (in which a business process is being modeled). For example, the GUI may be generated by a business activity monitor (BAM) computer 299. Numerous modifications and adaptations of the embodiments described herein are encompassed by the scope of the invention.

What is claimed is:

1. A computer-implemented method of transferring data sensed from a business process, the method comprising:
   receiving, through a graphical user interface, a selection of a first portion in a plurality of portions of the business process;
   responding to receipt of the selection of the first portion, by displaying an indication to acknowledge enablement of data capture from the first portion;
   receiving through the graphical user interface, a selection of a first publish type in a plurality of publish types, each publish type in the plurality of publish types being uniquely associated with a specific predetermined software in a plurality of predetermined softwares; and
   transferring at least a description of the business process, an identification of the first portion, and the first publish type to a computer that is to execute the business process, capture data from the first portion during execution of the business process and execute a first software associated with the first publish type to transfer data to a destination.

2. The method of claim 1 wherein:
the first publish type is a database type; and
the computer is to use a predefined relational schema to persist the data being transferred in a database at the destination.

3. The method of claim 1 further comprising:
receiving through the graphical user interface, an identification of the destination;
transferring to the computer, the identification of the destination; and
wherein the destination is in another computer.

4. The method of claim 1 wherein:
the first portion of the business process comprises an activity to raise an exception error; and
the data being captured is to be transferred on occurrence of a fault in the first portion.

5. The method of claim 1 wherein:
the description of the business process is transferred with at least the identification of the first portion during deployment of the business process.

6. The method of claim 1 wherein:
the identification of said first portion is transferred in another description independent of the description of the business process.

7. The method of claim 1 wherein:
the description of the business process is transferred during deployment of the business process; and
the identification of said first portion is received at run time, after the deployment of the business process.)

8. The method of claim 1 wherein:
to indicate the receipt of the selection of the first portion, the graphical user interface displays an icon adjacent to the first portion; and
when an association is defined between the first portion, the first publish type and the destination, the icon displayed by the graphical user interface is modified relative to when the first portion is selected but not associated with the first publish type and the destination.)

9. The method of claim 1 further comprising:
receiving through the graphical user interface, an XPATH expression as an identity of the destination.

10. The method of claim 1 further comprising:
receiving through the graphical user interface, a Boolean expression to be applied to data captured from the first portion to decide whether or not to transfer the data to the destination.

11. The method of claim 1 wherein the computer is hereinafter a first computer, and wherein:
the destination is in a second computer; and
the data is to be transferred by the first computer without persistence in a database prior to the transfer.

12. The method of claim 1 wherein:
multiple destinations including said destination are associated with the first portion; and
the same data is to be transferred by the computer, to each of the multiple destinations.

13. The method of claim 12 wherein:
disabling transfer of the data to one of the multiple destinations does not affect transfer of the data to one or more remaining destinations among the multiple destinations.

14. One or more non-transitory computer-readable media comprising a plurality of instructions to be executed by at least one processor, the instructions comprising:

instructions to receive, through a graphical user interface, a selection of a first portion in a plurality of portions of a business process;
instructions to respond to receipt of the selection of the first portion, by displaying an indication to acknowledge enablement of data capture from the first portion;
instructions to receive through the graphical user interface, a selection of a first publish type in a plurality of publish types, each publish type in the plurality of publish types being uniquely associated with a specific predetermined software in a plurality of predetermined softwares;
instructions to transmit at least a description of the business process, an identification of the first portion, and the first publish type to a computer that is to execute the business process, capture data from the first portion during execution of the business process and execute a first software associated with the first publish type to transfer data to a destination.

15. The one or more non-transitory computer-readable media of claim 14 wherein:
on execution of said instructions, said description of the business process is to be transferred with at least the identification of the first portion, during deployment of the business process.

16. The one or more non-transitory computer-readable media of claim 14 wherein:
on execution of said instructions, said identification of the first portion is transferred in another description independent of said description of the business process.

17. The one or more non-transitory computer-readable media of claim 14 wherein:
on execution of said instructions, said description of the business process is transferred during deployment of the business process and said identification of the first portion is performed at run time, after said deployment of the business process.

18. The one or more non-transitory computer-readable media of claim 14 wherein on execution of the plurality of instructions:
to indicate the receipt of the selection of the first portion, the graphical user interface displays an icon adjacent to the first portion; and
when an association is defined between the first portion, the first publish type and the destination, the icon displayed by the graphical user interface is modified relative to when the first portion is selected but not associated with the first publish type and the destination.

19. The one or more non-transitory computer-readable media of claim 14 further comprising:
instructions to receive through the graphical user interface, an XPATH expression as an identity of the destination.

20. The one or more non-transitory computer-readable media of claim 14 further comprising:
instructions to receive through the graphical user interface, a Boolean expression to be applied to data captured from the first portion to decide whether or not to transfer the data to the destination.

21. The one or more non-transitory computer-readable media of claim 14 wherein:
the destination is in a second computer; and
the data is to be transferred without persistence in a database prior to the transfer.

22. The one or more non-transitory computer-readable media of claim 14 wherein:
multiple destinations including said destination are associated with the first portion on execution of the plurality of instructions; and the same data is to be transferred by the computer, to each of the multiple destinations.

23. The one or more non-transitory computer-readable media of claim 22 further comprising:

instructions to disable transfer of the data to one of the multiple destinations without affecting transfer of the data to one or more remaining destinations among the multiple destinations.

24. An apparatus for transferring data sensed from a business process, the apparatus comprising:

means for receiving a selection of a first portion in a plurality of portions of the business process;

means for responding to receipt of the selection of the first portion, by displaying an indication to acknowledge enablement of data capture from the first portion;

means for receiving a selection of a first publish type in a plurality of publish types, each publish type in the plurality of publish types being uniquely associated with a specific predetermined software in a plurality of predetermined softwares; and means for transferring at least a description of the business process, an identification of the first portion, and the first publish type to a computer that is to execute the business process, capture data from the first portion during execution of the business process and execute a first software associated with the first publish type to transfer data to a destination.

* * * * *

UNITED STATES PATENT AND TRADEMARK OFFICE
CERTIFICATE OF CORRECTION

PATENT NO. : 8,473,453 B2
APPLICATION NO. : 12/395596
DATED : June 25, 2013
INVENTOR(S) : Mueller et al.

It is certified that error appears in the above-identified patent and that said Letters Patent is hereby corrected as shown below:

In the Specification

In column 6, line 15, delete "lA" and insert -- 1A --, therefor.

In column 16, line 41, delete "successfully"" and insert -- successfully". --, therefor.

In column 26, line 65, delete "attribue" and insert -- attribute --, therefor.

In column 29-30, line 67, delete "coresponds" and insert -- corresponds --, therefor.

In column 31-32, line 4, delete "variabales" and insert -- variables --, therefor.

Signed and Sealed this
Twenty-second Day of October, 2013

Teresa Stanek Rea
*Deputy Director of the United States Patent and Trademark Office*